United States Patent
Komoriya

(10) Patent No.: US 11,837,889 B2
(45) Date of Patent: Dec. 5, 2023

(54) POWER RECEIVING APPARATUS, POWER TRANSMITTING APPARATUS, CONTROL METHOD OF POWER RECEIVING APPARATUS, CONTROL METHOD OF POWER TRANSMITTING APPARATUS, AND NON-TRANSITORY COMPUTER-READABLE STORAGE MEDIUM

(71) Applicant: CANON KABUSHIKI KAISHA, Tokyo (JP)

(72) Inventor: Mitsuo Komoriya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 636 days.

(21) Appl. No.: 17/076,669

(22) Filed: Oct. 21, 2020

(65) Prior Publication Data
US 2021/0057925 A1    Feb. 25, 2021

Related U.S. Application Data

(63) Continuation of application No. PCT/JP2019/016397, filed on Apr. 17, 2019.

(30) Foreign Application Priority Data

Apr. 27, 2018   (JP) ................. 2018-087491

(51) Int. Cl.
| | | |
|---|---|---|
| H02J 7/00 | (2006.01) | |
| H02J 50/80 | (2016.01) | |
| H02J 50/12 | (2016.01) | |
| H04W 12/065 | (2021.01) | |

(52) U.S. Cl.
CPC ......... *H02J 7/00045* (2020.01); *H02J 50/12* (2016.02); *H02J 50/80* (2016.02); *H04W 12/065* (2021.01)

(58) Field of Classification Search
USPC ....................................................... 320/108
See application file for complete search history.

(56) References Cited

U.S. PATENT DOCUMENTS

2010/0270969 A1*  10/2010  Sip .................... H02J 50/10
                                                                320/108
2020/0366136 A1*  11/2020  Tachiwa .......... H02J 7/00045

FOREIGN PATENT DOCUMENTS

| EP | 3343727 A1 | 7/2018 |
|---|---|---|
| JP | 2008-206233 A | 9/2008 |
| JP | 2010-104097 A | 5/2010 |
| JP | 2015-520593 A | 7/2015 |
| JP | 2016-007116 A | 1/2016 |
| JP | 2017-73956 A | 4/2017 |

(Continued)

Primary Examiner — Mohammed Alam
(74) Attorney, Agent, or Firm — Canon U.S.A., Inc. IP Division

(57) ABSTRACT

A power receiving apparatus 200 wirelessly receives power from a power transmitting apparatus 100, mutually performs device authentications with the power transmitting apparatus 100, and determines content related to power reception on the basis of a result of a performed device authentication. The apparatus 200 is capable of performing control such that in response to success in an earlier performed device authentication among the authentications, another device authentication among the authentications is performed, and performing control such that in response to failure in the earlier performed device authentication, said another device authentication is not performed.

19 Claims, 13 Drawing Sheets

(56) References Cited

FOREIGN PATENT DOCUMENTS

| | | |
|---|---|---|
| JP | 2019-41541 A | 3/2019 |
| JP | 2019-193533 A | 10/2019 |
| WO | 2013/151831 A1 | 10/2013 |

* cited by examiner

FIG. 6A

|  | NOT SUPPORTING USB AUTHENTICATION (600) | FAILED USB AUTHENTICATION (601) | SUCCESSFUL USB AUTHENTICATION (602) |
|---|---|---|---|
| NOT SUPPORTING WPT AUTHENTICATION (603) | 5 | 0, 2.5, 5 | 5 |
| FAILED WPT AUTHENTICATION (604) | 0, 2.5, 5 | 0, 2.5, 5 | 0, 2.5, 5 |
| SUCCESSFUL IN WPT AUTHENTICATION (605) | 5 | 0, 2.5, 5 | 15 |

FIG. 6B

|  | 610 |
|---|---|
| NOT SUPPORTING WPT AUTHENTICATION (613) | 5 |
| FAILED WPT AUTHENTICATION (614) | 0, 2.5, 5 |
| SUCCESSFUL IN WPT AUTHENTICATION (615) | 15 |

FIG. 10A

|       | bit7 | bit6 | bit5 | bit4 | bit3 | bit2 | bit1 | bit0 |
|-------|------|------|------|------|------|------|------|------|
| Bank0 | Power Class | | Maximum Power Value | | | | | |
| Bank1 | Reserved(1000) | | | | | | | |
| Bank2 | Prop | Reserved(1001) | | | ZERO | Count | | |
| Bank3 | Window Size | | | | Window Offset | | | |
| Bank4 | Neg | Polarity | | Depth | | Reserved(1002) | | |

FIG. 10B

|       | bit7 | bit6 | bit5 | bit4 | bit3 | bit2 | bit1 | bit0 |
|-------|------|------|------|------|------|------|------|------|
| Bank0 | Power Class | | Guaranteed Power Value | | | | | |
| Bank1 | Reserved(1100) | | Potential Power Value | | | | | |
| Bank2 | Reserved(1101) | | | | | | WPID | Not Res Sens |

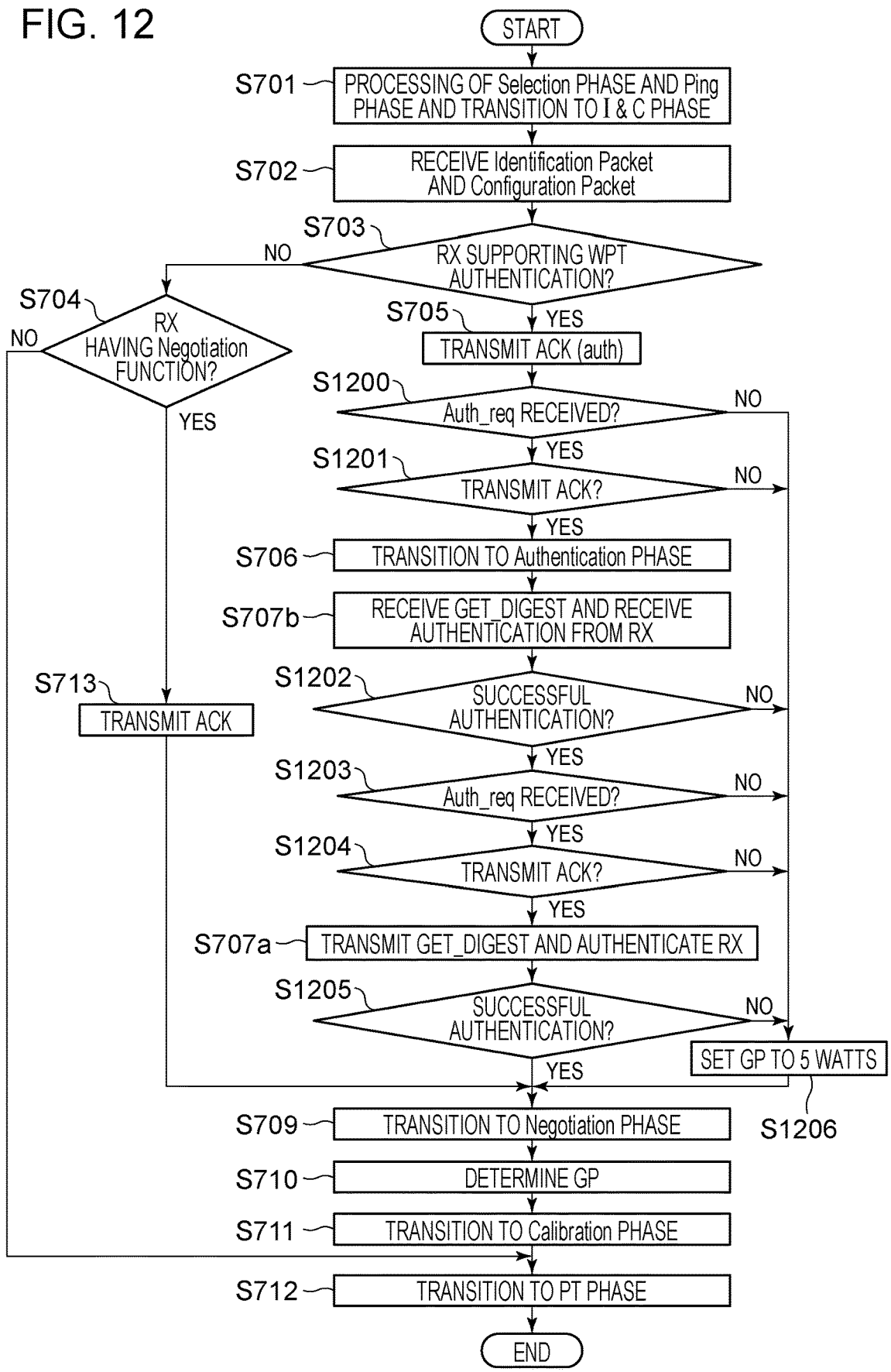

POWER RECEIVING APPARATUS, POWER TRANSMITTING APPARATUS, CONTROL METHOD OF POWER RECEIVING APPARATUS, CONTROL METHOD OF POWER TRANSMITTING APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP2019/016397, filed Apr. 17, 2019, which claims the benefit of Japanese Patent Application No. 2018-087491, filed Apr. 27, 2018, both of which are hereby incorporated by reference herein in their entirety.

BACKGROUND

Field

The present disclosure relates to a power receiving apparatus, a power transmitting apparatus, a control method of the power receiving apparatus, a control method of the power transmitting apparatus, and a non-transitory computer-readable storage medium.

Background Art

Technological development of a wireless power transmission system has been widely conducted in recent years. PTL1 discloses a power transmitting apparatus and a power receiving apparatus that comply with a standard (hereinafter referred to as "WPC standard") established by Wireless Power Consortium (WPC), which is the standardization organization of contactless charging standards. PTL2 discloses a method for device authentication between a power transmitting apparatus and a power receiving apparatus for contactless charging. According to PTL2, the power transmitting apparatus transmits challenge data to the power receiving apparatus, and the power receiving apparatus transmits response data, which is generated by performing authentication computation on the challenge data, to the power transmitting apparatus. The power transmitting apparatus verifies the response data received from the power receiving apparatus, thereby executing a device authentication protocol. In PTL2, the configuration described above makes high-security authentication processing feasible.

CITATION LIST

Patent Literature

PTL1: Japanese Patent Laid-Open No. 2016-007116
PTL2: Japanese Patent Laid-Open No. 2010-104097

However, when authentication processing is performed, convenience may be impaired depending on the power transmitting apparatus and the power receiving apparatus. For example, when the power transmitting apparatus and the power receiving apparatus mutually perform authentication processing to enhance security, the following issue occurs. Specifically, even if the validity of the target apparatus is not recognized through the earlier performed authentication processing, it is necessary to wait for the execution of the other authentication processing, resulting in an occurrence of unnecessary processing.

The present disclosure has been made in view of the foregoing problems, and an object thereof is to reduce unnecessary processing caused when the validity of the target apparatus that performs authentication processing is not recognized.

SUMMARY

An aspect of the present disclosure provides a power receiving apparatus which comprises: a power receiving unit configured to wirelessly receive power from a power transmitting apparatus; an authentication unit configured to mutually perform device authentications with the power transmitting apparatus; and a control unit configured to determine content related to power reception on the basis of a result of a performed device authentication, wherein the control unit is capable of performing control such that in response to success in an earlier performed device authentication among the authentications, another device authentication among the authentications is performed, and performing control such that in response to failure in the earlier performed device authentication, said another device authentication is not performed.

Further features of the present disclosure will become apparent from the following description of exemplary embodiments with reference to the attached drawings.

BRIEF DESCRIPTION OF THE DRAWINGS

FIG. 6A is a diagram illustrating an example relationship between results of device authentication performed by the power transmitting apparatus and set values of GP.

FIG. 6B is a diagram illustrating an example relationship between results of device authentication performed by the power receiving apparatus and set values of GP.

FIG. 10A is a diagram illustrating an example configuration of a Configuration Packet.

FIG. 10B is a diagram illustrating an example configuration of a Power Transmitter Capability Packet.

FIG. 12 is another example of the flowchart illustrating state transitions made by the control unit of the power transmitting apparatus up to power transmission.

DESCRIPTION OF THE EMBODIMENTS

Embodiment 1

The following describes embodiments of the present disclosure with reference to the accompanying drawings.

(System Configuration)

Figure 3:
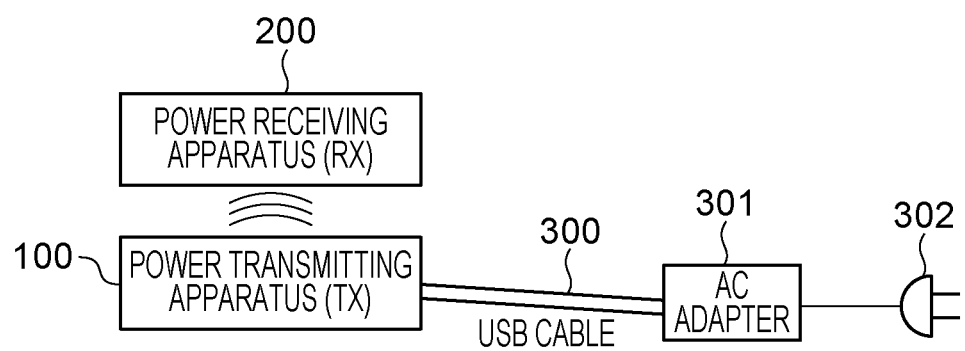
FIG. 3 is a block diagram illustrating an example configuration of a contactless charging system.

FIG. 3 illustrates an example configuration of a wireless power transmission system (contactless charging system) according to this embodiment. In FIG. 3, a power transmitting apparatus (hereinafter referred to as "TX") 100 wirelessly transmits power, which is supplied by wire using an AC adapter 301, a USB cable 300, and the like, to a power receiving apparatus (hereinafter referred to as "RX") 200. The RX 200 receives the power wirelessly transmitted from the TX 100 and charges, for example, a battery disposed in the RX 200. The AC adapter 301 converts the power of the commercial power supply, which is supplied via a power supply plug 302, into a voltage suitable for the TX 100 and supplies the voltage to the TX 100.

The configuration illustrated in FIG. 3 is an example, and any other configuration may be used. For example, in the following, wired power supply that enables device authentication will be described as an example, although this is not intended to be limiting. That is, the present disclosure is also applicable to wired power supply that does not involve device authentication. In the following, it is assumed that wired power supply is performed in accordance with the USB Power-Delivery standard and that device authentication is performed in accordance with an Authentication standard supported by the USB Power-Delivery standard. However, any other standard may be used.

While a single TX 100 and a single RX 200 are illustrated in FIG. 3, a plurality of TXs 100 may receive power supplied by wire and transmit the power to a common single RX 200 or separate RXs 200. Alternatively, a single TX 100 may transmit power to a plurality of RXs 200. The following describes a case where contactless charging complying with the WPC (Wireless Power Consortium) standard is performed between the TX 100 and the RX 200, although this is not intended to be limiting. Contactless charging may be performed in accordance with any other standard.

(Apparatus Configuration)

Next, an example configuration of a power transmitting apparatus (the TX 100) and a power receiving apparatus (the RX 200) available in the contactless charging system illustrated in FIG. 3 will be described.

Figure 1:
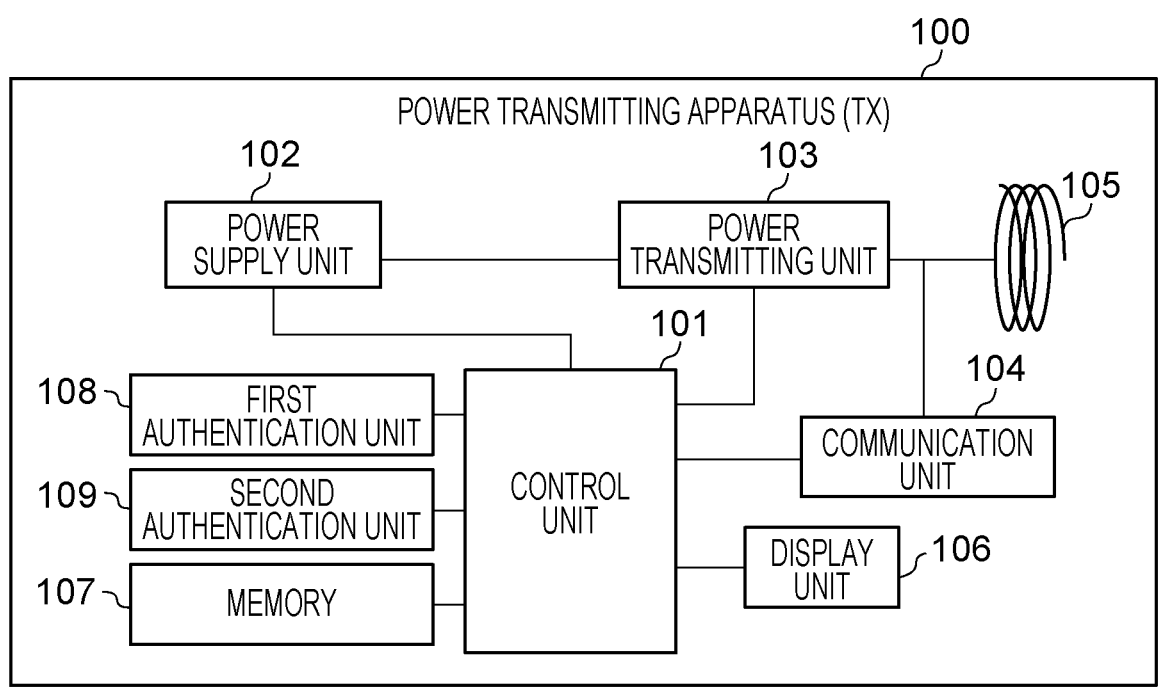
FIG. 1 is a block diagram illustrating an example configuration of a power transmitting apparatus.

FIG. 1 is a block diagram illustrating an example configuration of the TX 100. The TX 100 complies with the WPC standard and has functions specified in version 1.2.2 of the WPC standard (hereinafter referred to as "WPC standard v1.2.2"). It is assumed here that the TX 100 has a power supply capacity of outputting up to 15 watts of power to a charging unit of the RX 200 supporting the WPC standard like the TX 100. In one example, the TX 100 can include a control unit 101, a power supply unit 102, a power transmitting unit 103, a communication unit 104, a power transmitting coil 105, a display unit 106, a memory 107, a first authentication unit 108, and a second authentication unit 109. This embodiment may also be applied to the TX 100 capable of transmitting 15 watts or more of power or to a TX having a capacity of supplying only 15 watts or less of power.

The control unit 101 includes, for example, one or more processors such as a CPU (Central Processing Unit) or an MPU (Micro Processing Unit) and controls the overall operation of the TX 100. That is, the control unit 101 controls the operation of the power supply unit 102, the power transmitting unit 103, the communication unit 104, the power transmitting coil 105, the display unit 106, the memory 107, the first authentication unit 108, and the second authentication unit 109. The control unit 101 may be configured to include, for example, an application-specific integrated circuit (ASIC), an FPGA (field-programmable gate array), or the like. The control unit 101 determines content related to power transmission on the basis of a result of WPT authentication described below and a result of USB authentication for a power supply source (such as the AC adapter 301 and the USB cable 300). For example, the content is the maximum value of the power value allowable at the time of power transmission.

The power supply unit 102 receives power supply for the operation of the TX 100 from the AC adapter 301 via the USB cable 300 and supplies power for operating at least the control unit 101 and the power transmitting unit 103. The power supply unit 102 is configured to be capable of supporting wired device authentication and power supply of a power supply device. For example, as illustrated in FIG. 3, to receive power supply via the USB cable 300, the power supply unit 102 can support the USB Power-Delivery standard and the Authentication standard for performing device authentication between connected USB devices. The TX 100 may receive power supply in compliance with a standard other than the USB Power-Delivery standard, or may perform device authentication in accordance with a standard other than the Authentication standard. Accordingly, the power supply unit 102 can be configured to be capable of supporting a standard other than these standards. Alternatively, the power supply unit 102 (or the first authentication unit 108 described below) may be configured to be capable of supporting a plurality of standards, and may determine the standard to be used, for example, in accordance with the form of connection with the power supply source (for example, in accordance with which terminal of the TX 100 is used).

The power transmitting unit 103 generates an AC voltage and an AC current to be transmitted to the RX 200 via the power transmitting coil 105. The power transmitting unit 103 may convert, for example, a DC voltage to be supplied from the power supply unit 102 into an AC voltage by using a switching circuit having a half-bridge or full-bridge configuration using an FET (Field Effect Transistor). In this case, the power transmitting unit 103 can include a gate driver that controls ON/OFF of the FET.

The communication unit 104 performs control communication with the RX 200 (a communication unit 204 in FIG. 2) for the control of contactless charging based on the WPC standard. The communication unit 104 can communicate with the RX 200 via so-called in-band communication, which is accomplished by modulating the AC voltage or current generated by the power transmitting unit 103 and superimposing information on wireless power. However, this is not intended to be limiting, and the communication unit 104 may communicate with the RX 200 via so-called out-band (out-of-band) communication. The out-band communication can be performed by, for example, NFC, RFID, Wi-Fi (registered trademark), Bluetooth (registered trademark) Low Energy, or the like. The out-band communication, described here, refers to communication performed without superimposing information on wireless power. At least a portion of the frequency band used for out-band communication is not included in the frequency band for power transmission. Further, the frequency band used for out-band communication may not be completely overlapped with the frequency band for power transmission.

The display unit 106 displays information on the state of the TX 100 or the state of the contactless charging system including the devices illustrated in FIG. 3, such as the TX 100, the RX 200, the USB cable 300, and the AC adapter 301, in such a manner that the user can check the information. The display unit 106 can be constituted by, for example but not limitation, an LED (Light Emitted Diode). For example, the display unit 106 may include, in place of or in addition to the LED, a speaker, a vibration generation circuit, a display, and so on. The memory 107 stores the state of each element and the entire state of the TX 100 and the contactless charging system in FIG. 3.

The first authentication unit 108 performs device authentication with the power supply unit 102 for the devices connected to the power supply unit 102, namely, the USB cable 300 and the AC adapter 301. In this embodiment, the first authentication unit 108 is assumed to perform device authentication complying with the USB Authentication standard. However, this is not intended to be limiting, and any other standard supporting device authentication, such as Qualcomm's Quick Charge standard, may be used.

The second authentication unit 109 performs device authentication between the TX 100 and the RX 200 by communication via the communication unit 104. In this embodiment, device authentication performed by the second authentication unit 109, described below, is referred to as Wireless Power Transfer authentication or WPT authentication. In addition, the second authentication unit 109 may be divided into a portion to be used to perform WPT authentication on the RX 200, and a portion to be used to receive WPT authentication from the RX 200, or these portions may be integrated.

In FIG. 1, the control unit 101, the power supply unit 102, the power transmitting unit 103, the communication unit 104, the memory 107, the first authentication unit 108, and the second authentication unit 109 are illustrated as separate blocks. However, a plurality of desired blocks among these blocks may be implemented in the same chip. For example, the power supply unit 102 supporting USB Power-Delivery and the first authentication unit 108 supporting the USB Authentication standard may be implemented in the same chip as a USB-related chip. In this case, the TX 100 can be configured to connect the control unit 101 and the USB-related chip by, for example, GPIO (General Purpose Input/Output) or serial communication. Further, for example, a plurality of desired blocks among the second authentication unit 109, the control unit 101, the memory 107, the power transmitting unit 103, and the communication unit 104 may be implemented in the same chip. Alternatively, in FIG. 1, a single block may be divided into a plurality of blocks and may be implemented in a plurality of chips in some cases.

Figure 2:
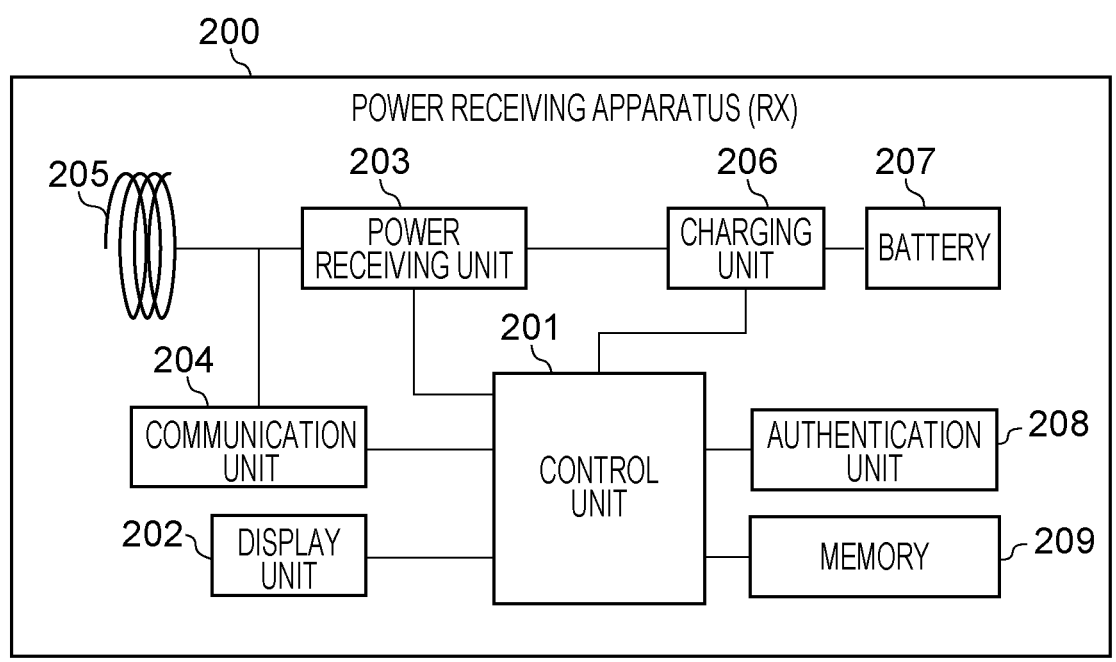
FIG. 2 is a block diagram illustrating an example configuration of a power receiving apparatus.

FIG. 2 is a block diagram illustrating an example configuration of the RX 200. Like the TX 100, the RX 200 also complies with the WPC standard and has functions specified in the WPC standard v1.2.2. In one example, the RX 200 can include a control unit 201, a display unit 202, a power receiving unit 203, a communication unit 204, a power receiving coil 205, a charging unit 206, a battery 207, an authentication unit 208, and a memory 209.

The control unit 201 is configured to include, for example, one or more processors such as a CPU or an MPU, an ASIC, an FPGA, or the like and controls the overall operation of the RX 200. That is, the control unit 201 controls the operation of the display unit 202, the power receiving unit 203, the communication unit 204, the power receiving coil 205, the charging unit 206, the battery 207, the authentication unit 208, and the memory 209. Further, the control unit 201 determines content related to power reception on the basis of a result of device authentication for the TX 100 described below. For example, the content is the maximum value of the power value for which a request is made to the TX 100.

The display unit 202 displays information, such as the state of power supply or the charging state of the RX 200, in such a manner that the user can check the information. In this embodiment, the display unit 202 is assumed to be an LED. The display unit 202 may include, in addition to or in place of the LED, for example, a speaker, a vibration generation circuit, a display, and so on.

The power receiving unit 203 receives an electromagnetic wave, which is radiated from the power transmitting coil 105, via the power receiving coil 205 and converts an AC voltage and AC current obtained from received power into a DC voltage and DC current to be used when the control unit 201, the charging unit 206, and the like operate. In this embodiment, the power receiving unit 203 is assumed to have a capacity of outputting up to 15 watts of power to the charging unit 206.

The communication unit 204 performs control communication with the communication unit 104 of the TX 100 for the control of contactless charging based on the WPC standard. The control communication can be performed by load modulation, which is accomplished by varying the load on the RX 200 side to change the state of power transmission between the TX 100 and the RX 200 and varying the current flowing through the power transmitting coil 105 to transmit information. The communication unit 204 may perform control communication by in-band communication such as this load modulation or perform control communication by the out-band communication described above.

The charging unit 206 charges the battery 207 by using the DC voltage and DC current supplied from the power receiving unit 203. The authentication unit 208 mutually performs device authentication with the second authentication unit 109 of the TX 100 by communication via the communication unit 204. The memory 209 stores the state of each element and the entire state of the RX 200 and the contactless charging system (FIG. 3). The TX 100 or the RX 200 supporting the WPC standard including WPT authentication is hereinafter expressed as "supporting the WPC standard version A". It is assumed here that the WPC standard version A is a successor standard of the WPC standard v1.2.2, additionally having at least the WPT authentication function.

In FIG. 2, the power receiving unit 203, the authentication unit 208, the control unit 201, the memory 209, the communication unit 204, and the charging unit 206 are illustrated as separate blocks. However, a plurality of desired blocks among these blocks may be implemented in the same chip. Alternatively, in FIG. 2, a single block may be divided into a plurality of blocks and may be implemented in a plurality of chips in some cases.

In the contactless charging system according to this embodiment, the first authentication unit 108 of the TX 100 performs device authentication with the AC adapter 301 and the USB cable 300 using a first communication protocol (for example, USB authentication via a USB cable). The second authentication unit 109 of the TX 100 mutually performs device authentication with the RX 200 by using a second communication protocol using different media (for example, the power transmitting coil 105 and the power receiving coil 205) from the first communication protocol.

In this embodiment, the AC adapter 301, the USB cable 300, and the TX 100 (the power supply unit 102) are USB devices. It can be confirmed that, in response to the USB devices supporting USB authentication and succeeding in USB authentication, an issue such as excessive heat generation is less likely to occur even if power determined in USB authentication is applied to these devices. That is, it can be said that if USB authentication is successful, the power supply unit 102 of the TX 100, the USB cable 300, and the AC adapter 301 do not excessively generate heat in response to the determined power being supplied to the power supply unit 102 of the TX 100 from the AC adapter 301 via the USB cable 300.

In contrast, if any of the power supply unit 102, the USB cable 300, and the AC adapter 301 does not support USB authentication, USB authentication is not successful. In this case, when the power determined in USB authentication is applied, an issue such as excessive generation of heat from any of the devices or the cable can occur. Devices not supporting USB authentication include a device supporting any of a plurality of versions of USB standards before the establishment of the USB authentication standard. In this embodiment, a USB device supporting any of a plurality of versions of USB standards before the establishment of the USB authentication standard is referred to as a legacy USB device.

If any of the power supply unit 102, the USB cable 300, and the AC adapter 301 fails in USB authentication, an issue such as heat generation can occur when the power determined in USB authentication is applied. A failure in USB authentication includes a case where at least any one of the USB cable 300 and the AC adapter 301 can be a USB device nominally supporting but not actually supporting USB authentication.

If the RX 200 and the TX 100 support the WPC standard version A and are mutually successful in WPT authentication, an issue such as excessive generation of heat from the RX 200 and the TX 100 is less likely to occur even if the RX 200 and the TX 100 exchange the predetermined power determined in the standard. If at least one of the RX 200 and the TX 100 does not support the WPC standard version A, in contrast, an issue such as excessive generation of heat from the apparatus not supporting the WPC standard version A can occur when the determined power described above is applied. Devices not supporting the WPC standard version A include a device supporting any of a plurality of versions of WPC standards preceding the WPC standard version A. In this embodiment, a TX or an RX supporting any of a plurality of versions of WPC standards preceding the WPC standard version A is referred to as a legacy TX or RX.

Further, failures in WPT authentication between the TX 100 and the RX 200 include a case where these devices nominally support but do not actually support WPT authentication. Also in this case, WPT authentication is not successful. Thus, an issue such as excessive heat generation can occur when the determined power described above is applied. It should be noted that WPT authentication between devices supporting WPT authentication is always successful.

In this embodiment, when the USB cable 300 and the AC adapter 301 are successful in USB authentication and when the RX 200 and the TX 100 are mutually successful in WPT authentication, it is determined that the predetermined power determined in the standard can be supplied. That is, the power receiving unit 203 of the RX 200 can supply the predetermined power (15 watts) to the load (in this embodiment, the charging unit 206) in a state where an issue such as excessive heat generation is less likely to occur. If any of the TX 100 (the power supply unit 102), the USB cable 300, and the AC adapter 301 is not successful in USB authentication or either of the RX 200 and the TX 100 is not successful in WPT authentication, an issue is likely to occur for the supply of the predetermined power. That is, when the power receiving unit 203 of the RX 200 supplies a predetermined power of 15 watts to the load, an issue such as excessive heat generation can occur. In the following, to avoid such a risk, the power to be supplied from the power receiving unit 203 is limited to a power value (for example, 5 watts or less) smaller than the predetermined power (15 watts) when authentication is not successful.

(Process Procedure)

Figure 4:
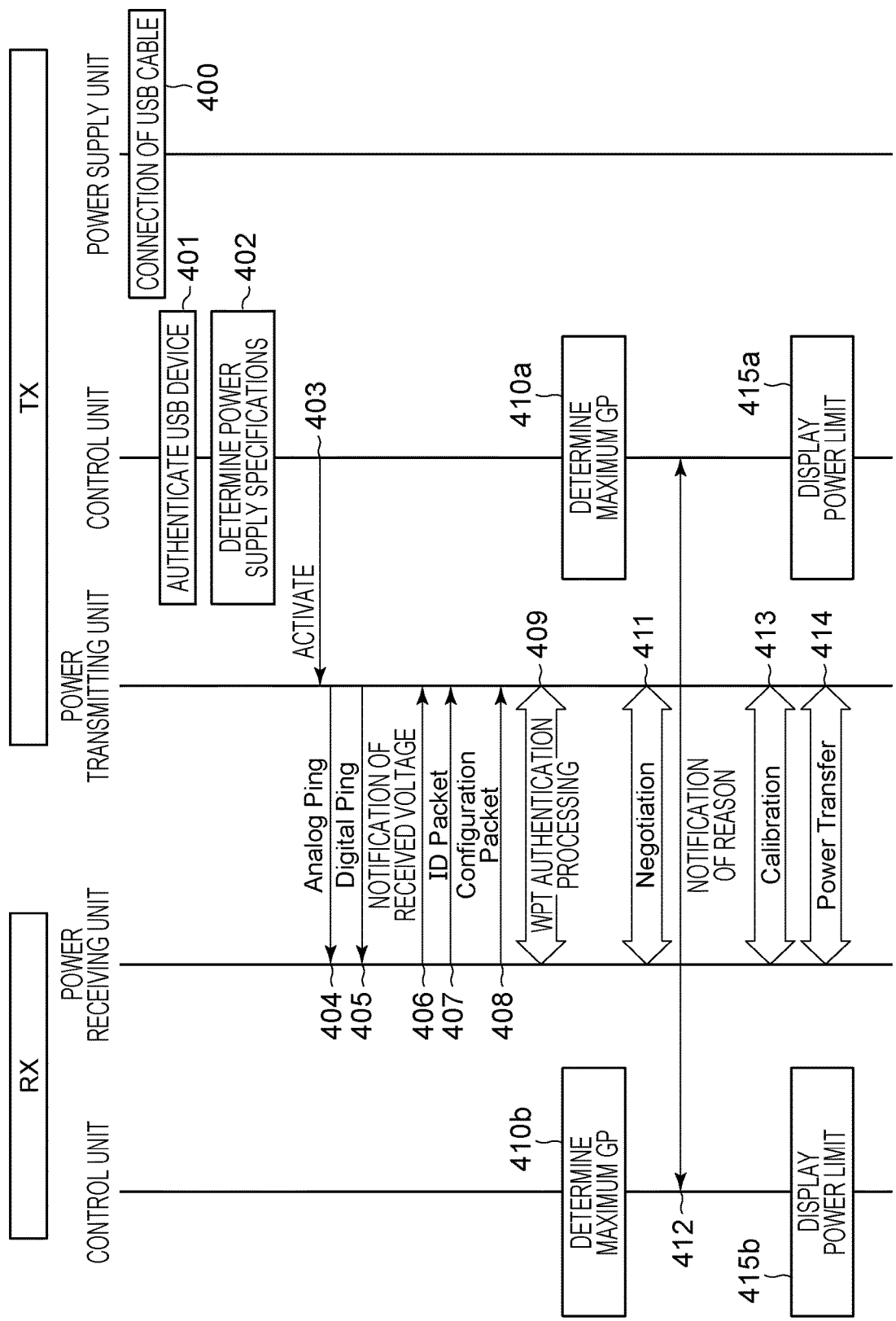
FIG. 4 is a diagram illustrating an example operation sequence of the contactless charging system, including USB authentication and WPT authentication.
Figure 5A:
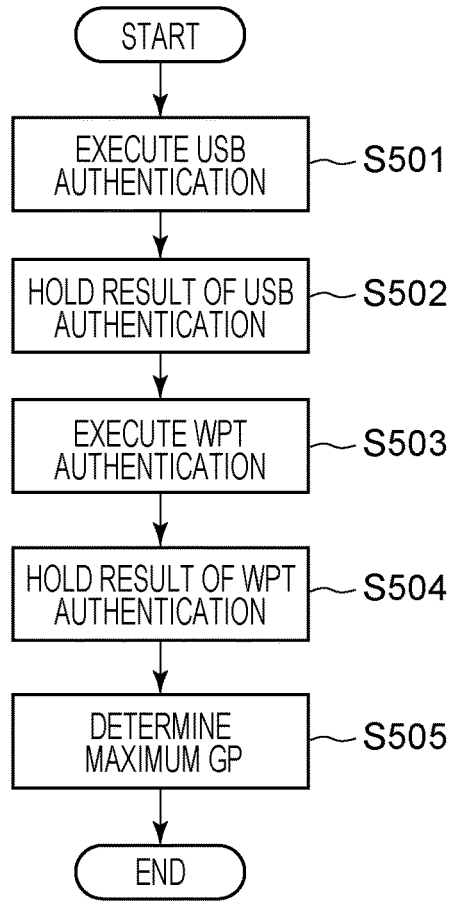
FIG. 5A is a flowchart illustrating an example of a GP setting process performed by a control unit of the power transmitting apparatus.
Figure 5B:
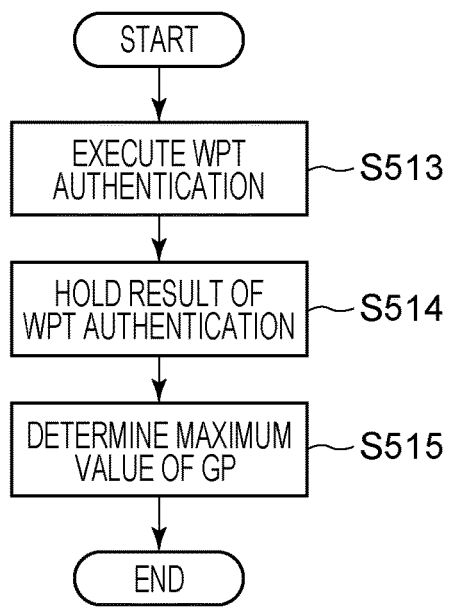
FIG. 5B is a flowchart illustrating an example of a GP setting process performed by a control unit of the power receiving apparatus.

Next, an example procedure of a process executed in a contactless wireless communication system will be described. FIG. 4 is a sequence chart illustrating an example procedure of a process including USB authentication and WPT authentication, which are executed in this embodiment. FIG. 5A is a flowchart illustrating an example procedure of a process executed by the control unit 101 of the power transmitting apparatus (the TX 100) for the setting of Guaranteed Power (hereinafter referred to as "GP") according to this embodiment. FIG. 5B is a flowchart illustrating an example procedure of a process executed by the control unit 201 of the power receiving apparatus (the RX 200) for the setting of GP.

GP is a power value guaranteed by the TX 100 regarding the output power for the load of the power receiving unit 203 even if the positional relationship between the TX 100 and the RX 200 is shifted and the power transmission efficiency between the power transmitting coil 105 and the power receiving coil 205 is reduced. The load of the power receiving unit 203 is the target to which the power receiving unit 203 supplies power, and includes at least the charging unit 206. For example, when the GP is 5 watts, the TX 100 controls the power transmitting unit 103 so that the power receiving unit 203 can output 5 watts of power even if the positional relationship between the power transmitting and receiving coils is shifted and the power transmission efficiency between the coils is reduced. In this embodiment, the GP is limited in accordance with the result of authentication. This can prevent, for example, the occurrence of an issue such as excessive heat generation caused by the transmission of the power specified in the standard if authentication is not successful or authentication is not supported. First, an example of limit values of the GP to be used in a Negotiation described below in accordance with the results of USB authentication and WPT authentication will be described with reference to FIG. 6.

FIG. 6 include diagrams illustrating examples of limit values of the GP to be used in a Negotiation described below in accordance with the results of USB authentication and WPT authentication. FIG. 6A illustrates the limit values of the GP for the TX 100, and FIG. 6B illustrates the limit values of the GP for the RX 200.

In FIG. 6A, "not supporting USB authentication" in a column 600 indicates that at least any one of the power supply unit 102 of the TX 100, the USB cable 300, and the AC adapter 301 does not support USB authentication (but a device supporting USB authentication is successful in authentication). In a column 601, "failed USB authentication" indicates that at least any one of the power supply unit 102 of the TX 100, the USB cable 300, and the AC adapter 301 (at least nominally) supports USB authentication, but has failed in USB authentication. In column 602, "successful USB authentication" indicates that all of the power supply unit 102 of the TX 100, the USB cable 300, and the AC adapter 301 are successful in USB authentication. Further, a row 603 indicates that the RX 200 does not support WPT authentication, a row 604 indicates that the RX 200 supports WPT authentication, but has failed in WPT authentication, and a row 605 indicates that the RX 200 supports WPT authentication and is successful in WPT authentication. In the table, for fields containing three power values of the GP, namely, "0, 2.5, 5", setting is performed in advance such that one of the values is employed.

According to FIG. 6A, when USB authentication is not supported (the column 600), the GP is limited to 5 watts, regardless of the result of WPT authentication, to avoid excessive heat generation or the like. In the column 600, when WPT authentication has failed (the row 604), the GP may be limited to a smaller value than that when WPT authentication is not supported (the row 603), such as 0 watts (no power transmission) or 2.5 watts (smaller than 5 watts). This is because a failure in WPT authentication indicates the possibility of the RX being, for example, a fake that nominally, but not formally, implements WPT authentication and does not meet the WPC standard. In terms of excessive heat generation or the like, the GP is desirably limited to 5 watts. On the other hand, limiting the GP to a GP (0 watts or 2.5 watts) lower than that of a legacy RX that does not support WPT authentication but formally implements the standard can suppress or avoid power transmission to a fake that appears to support WPT authentication.

Likewise, when USB authentication has failed (the column 601), the GP may be limited to a smaller value than that when USB authentication is not supported (the column 600), such as 0 watts (no power transmission) or 2.5 watts (smaller than 5 watts), regardless of the result of WPT authentication. This is because a failure in USB authentication indicates the possibility of the authentication-target USB device being, for example, a fake that nominally, but not formally, implements USB authentication. Accordingly, limiting the GP to 0 watts or 2.5 watts, which is smaller than that for a legacy USB device that does not support USB authentication but formally implements the standard, can suppress or avoid the supply of power from a fake that appears to support USB authentication.

When USB authentication is successful (the column 602), excessive heat generation or the like is less likely to occur for the power supply unit 102 of the TX 100, the USB cable 300, and the AC adapter 301 even if the RX 200 supplies 15 watts (the maximum value of the GP that can be supplied from the TX 100 to the RX 200) to the load. Accordingly, the TX 100 sets the GP on the basis of the result of WPT authentication. For example, when WPT authentication is not supported (the row 603), the TX 100 limits the GP to 5 watts for the reasons described above, and when WPT authentication has failed (the row 604), the TX 100 limits the GP to a lower value (0 watts or 2.5 watts). When USB authentication is successful (the column 602) and WPT authentication is also successful (the row 605), it is determined that an issue such as excessive heat generation is less likely to occur, and the TX 100 sets the limit value of the GP to 15 watts, which is the maximum value of the power transmitting capacity of the TX 100 and the power receiving capacity of the RX 200. Alternatively, the RX 200 may send to the TX 100 a request for 15 watts of power, which is the maximum value of the power transmitting capacity of the TX 100 and the power receiving capacity of the RX 200, as the GP.

This embodiment exemplifies a case where USB authentication is performed. If USB authentication is not performed, USB authentication may be regarded as being successful, and the column 602 in FIG. 6A may be held as a table of the limit values of the GP.

The RX 200 does not perform USB authentication since no USB device is connected to the power supply system. Thus, the limit value of the GP is determined by the result of WPT authentication with the TX 100. In FIG. 6B, a row 613 indicates that the TX 100 does not support WPT authentication, a row 614 indicates that the TX 100 supports WPT authentication, but has failed in WPT authentication, and a row 615 indicates that the TX 100 supports WPT authentication and is successful in WPT authentication. In the table, for a field containing three power values of the GP, namely, "0, 2.5, 5", setting is performed in advance such that one of the values is employed.

When WPT authentication is not supported (the row 613), for reasons similar to those for the TX 100, the GP is limited to 5 watts, and when WPT authentication has failed (the row 614), the GP is limited to a lower GP (0 watts or 2.5 watts). When WPT authentication is successful (the row 615), it is determined that the risk described above does not occur, and the RX 200 sets the limit value of the GP to 15 watts, which is the maximum value of the capacities of the TX 100 and the RX 200.

In this way, the TX 100 determines the maximum value of the GP that can be allowed as the power value for power transmission in a negotiation in a Negotiation phase described below on the basis of the USB authentication result, the WPT authentication result, and the set values illustrated in FIG. 6A. The RX 200 determines the maximum value of the GP for which a request is made to the TX 100 in a negotiation in the Negotiation phase on the basis of the USB authentication result, the WPT authentication result, and the set values illustrated in FIG. 6B. When both USB authentication and WPT authentication are successful, the transmission power corresponding to the maximum capacity of the TX 100 and the RX 200 can be determined in a negotiation in the Negotiation phase.

Next, an example procedure of a process from the activation of the contactless charging system illustrated in FIG. 3 to power transmission will be described with reference to FIG. 4 and FIG. 5. If at least one device does not support authentication or has failed in authentication among the authentication-target devices in USB authentication and WPT authentication, the RX 200 operates so as not to send to the TX 100 a request for large power as the value of the GP.

First, when the USB cable 300 and the AC adapter 301 are connected to the power supply unit 102 of the TX 100 (400), the control unit 101 of the TX 100 performs USB authentication (401, S501). In USB authentication, the control unit 101 causes the first authentication unit 108 to operate and determines whether all of the authentication-target USB devices (in this embodiment, both the USB cable 300 and the AC adapter 301) support USB authentication. The first authentication unit 108 executes USB authentication on all the USB devices, and, if all the executed USB authentications are successful, the first authentication unit 108 determines "successful USB authentication".

In this embodiment, "not supporting USB authentication" and "failed USB authentication" are provided as authentication results in a case where any USB authentication is not successful. If at least one device supports USB authentication, but has failed in authentication, the first authentication unit 108 determines "failed USB authentication". If all of the devices that are not successful in USB authentication are devices not supporting USB authentication, the first authentication unit 108 determines "not supporting USB authentication". The first authentication unit 108 may determine either "failed USB authentication" or "not supporting USB authentication" on the basis of the attribute of a device that has failed in authentication. For example, if there is a device that has failed in authentication, the first authentication unit 108 can identify the attribute of the device and perform determination based on the attribute.

In this embodiment, for example, if the AC adapter 301 is successful in USB authentication, but the USB cable 300 does not support USB authentication, "not supporting USB authentication" is determined. For example, if the USB authentication of the AC adapter 301 is successful and the USB cable 300 supports USB authentication, but has failed in authentication, "failed USB authentication" is determined. For example, if both the AC adapter 301 and the USB cable 300 are successful in USB authentication, "successful USB authentication" is determined. The control unit 101 holds the USB authentication result in the memory 107 (S502).

Then, the control unit 101 determines power supply specifications for the AC adapter 301 regarding the voltage and current to be supplied from the AC adapter 301 in accordance with the sequence of USB PD (USB-Power Delivery standard) (402). Since the power supply voltage is determined by the internal configuration of the TX 100, in this case, the current value is determined. In this embodiment, the voltage of the power supply unit 102 is assumed to be 15 V, and the output current of the power supply unit 102 is assumed to be up to 3 A. The control unit 101 of the TX 100, when reducing the current value, determines the extent of reduction of the current value on the basis of the settings illustrated in FIG. 6A. For example, when USB authentication is not supported, the maximum value of the GP that can be allowed at the time of power transmission in a negotiation in the Negotiation phase (described below) of the WPC standard is determined to be 5 watts on the basis of the column 600 in FIG. 6A.

The control unit 101 determines the current value in consideration with a loss in the TX 100. For example, the system efficiency obtained in a case where the RX 200 outputs a GP of 5 watts when the positions of the power transmitting and receiving coils change and the efficiency between the coils becomes the lowest is assumed to be 50%. In this case, the power supplied from the power supply unit 102 to the power transmitting unit 103 or the control unit 101 is 10 watts (5 W×2). Since the power supply voltage is 15 V, the output current is 10 W/15 V=0.67 A. In this embodiment, when a USB device does not support USB authentication, the GP is limited to 5 watts. Accordingly, the current value to be determined by the power supply unit 102 by a negotiation with the AC adapter 301 on the basis of the sequence of USB PD is desirably about 0.67 A. The control unit 101 of the TX 100 determines power supply specifications for the AC adapter 301 on the basis of the current value to be determined. If USB authentication is successful, on the other hand, the power supply specifications are determined to be 2.0 A (15 W×2/15 V) so as to support a GP value of 15 watts.

Then, the control unit 101 of the TX 100 activates the power transmitting unit 103 (403). The activation of the power transmitting unit 103 can be implemented by, for example, so-called power-on reset in which power is applied to at least any one of the control unit 101, the power transmitting unit 103, and the communication unit 104 from the power supply unit 102. Alternatively, the first authentication unit 108 may input a reset signal (not illustrated) (LO: about 0 V) to at least any one of the control unit 101, the power transmitting unit 103, and the communication unit 104 of the TX 100 to reset at least any one of these functional units. In this case, after the power supply specifications are determined and the value of the GP is determined, the first authentication unit 108 sets the reset signal to HI (for example, 3.3 V) to cancel the reset.

Upon the activation of the power transmitting unit 103, the TX 100 starts the operation complying with the WPC standard. In this embodiment, in addition to the phases complying with the WPC standard, an Authentication phase is defined as a phase for performing WPT authentication. In the Authentication phase, the TX 100 and the RX 200 execute device authentication based on WPT authentication. When both the TX 100 and the RX 200 support the Authentication phase, the TX 100 and the RX 200 first execute the processing of a Selection phase. Then, the phase transitions to a Ping phase and an Identification & Configuration phase (hereinafter referred to as "I & C phase"), and thereafter the Authentication phase is executed. After the Authentication phase, processing is executed in the order of a Negotiation phase, a Calibration phase, and a Power Transfer phase (hereinafter referred to as "PT phase").

In the Selection phase, the power transmitting unit 103 transmits an Analog Ping via the power transmitting coil 105 (404). The Analog Ping is a signal of small power used to detect an object present near the power transmitting coil 105. The TX 100 detects the voltage value or current value of the power transmitting coil at the time of the transmission of the Analog Ping. If the voltage is less than a certain threshold or if the current value exceeds a certain threshold, the TX 100 determines that an object is present, and causes a transition to the Ping phase.

In the Ping phase, the TX 100 transmits a Digital Ping (405), which is larger than the Analog Ping. The magnitude of the Digital Ping is equal to power sufficient to activate the control unit 201 of the RX 200, which is present near the power transmitting coil 105. When activated by the Digital Ping received via the power receiving coil 205, the control unit 201 of the RX 200 notifies the TX 100 of the magnitude of the received voltage (406). Then, the phase transitions to the I & C phase. Upon receipt of the notification of the value of the received voltage, the TX 100 causes a transition to the I & C phase.

In the I & C phase, the RX 200 transmits an ID Packet and a Configuration Packet to the TX 100 (407 and 408). The TX 100 responds to the Configuration Packet transmitted from the RX 200 by using acknowledge (ACK). Then, the TX 100 and the RX 200 terminate the I & C phase and cause a transition to the Authentication phase. When the I & C phase is terminated, the TX 100 and the RX 200 can transmit data to each other.

Then, the second authentication unit 109 and the authentication unit 208 of the RX 200 mutually perform WPT authentication processing in the Authentication phase (409, S503, and S513). The authentication target of the TX 100 is the RX 200 serving as a power receiving apparatus in the contactless charging system. The authentication target of the RX 200 is the TX 100 serving as a power transmitting apparatus in the contactless charging system. The details of the Authentication phase will be described below.

The control unit 101 of the TX 100 holds the result of WPT authentication in the memory 107 (S504). The control unit 201 of the RX 200 holds the result of WPT authentication in the memory 209 (S514). The control unit 101 of the TX 100 determines the maximum value of the GP to be used in the Negotiation phase on the basis of the result of USB authentication held in the memory 107 in S502, the result of WPT authentication held in the memory 107 in S504, and FIG. 6A (410a and S505). On the other hand, the control unit 201 of the RX 200 determines the maximum value of the GP to be used in the Negotiation phase on the basis of the result of WPT authentication held in the memory 209 in S514 and FIG. 6B (410b and S515).

Thereafter, the control unit 101 of the TX 100 and the control unit 201 of the RX 200 perform a negotiation in the Negotiation phase and determine the GP (411). Here, the transmission power is negotiated on the basis of the results of device authentications performed by the first authentication unit 108 (USB authentication) and the second authentication unit 109 (WPT authentication) of the TX 100, and the authentication unit 208 of the RX 200 (WPT authentication). That is, a negotiation is performed such that the transmission power is less than or equal to the transmission power allowed for the limited GP value (410a and 410b).

For example, in the RX 200, if the result of WPT authentication indicates "successful WPT authentication", as illustrated in FIG. 6B, the setting of the GP to up to 15 watts is permitted. If the result of WPT authentication indicates "failed WPT authentication", on the other hand, the GP is limited to 5 watts or a smaller value. In the Negotiation phase, the control unit 201 sends to the TX 100 a request for the GP.

In the TX 100, if the result of USB authentication indicates "successful USB authentication" and the result of WPT authentication indicates "successful WPT authentication", as illustrated in FIG. 6A, the setting of the GP to up to 15 watts is permitted. If the result of USB authentication indicates "not supporting USB authentication", on the other hand, the GP is limited to 5 watts or a smaller value. In this case, in the Negotiation phase, if a request for a GP exceeding 5 watts is sent from the control unit 201 of the RX 200, the control unit 101 of the TX 100 transmits a NAK in response to the request. In response to a request for a GP less than or equal to the limit value, on the other hand, the control unit 101 transmits acknowledge (ACK).

As described above, the maximum value of the GP is determined on the basis of the results of USB authentication and mutual WPT authentication between the TX 100 and the RX 200. Accordingly, if any of a plurality of authentications has failed, the magnitude of the GP is limited, and excessive heat generation or the like can be prevented. The control unit 101 can set the GP to the maximum value of the capacity of the power transmitting unit 103 only when all the authentications are successful.

If no USB authentication is performed, the maximum value of the GP is determined on the basis of the result of mutual WPT authentication between the TX 100 and the RX 200. In this case, as described above, USB authentication may be regarded as being successful on the basis of the result of WPT authentication performed on the RX 200 by the TX 100, and the GP may be limited on the basis of the column 602 in FIG. 6A.

Then, the TX 100 and the RX 200 send the reason for limiting the GP to each other (412). The control unit 101 of the TX 100 notifies the control unit 201 of the RX 200 of the reason for limiting the GP. In response to the notification of the reason, the RX 200 is notified of the results of device authentications performed by the first authentication unit 108 and the second authentication unit 109. The control unit 201 of the RX 200 notifies the control unit 101 of the TX 100 of the reason for limiting the GP. In response to the notification of the reason, the TX 100 is notified of the result of the device authentication performed by the authentication unit 208.

Figure 8A:
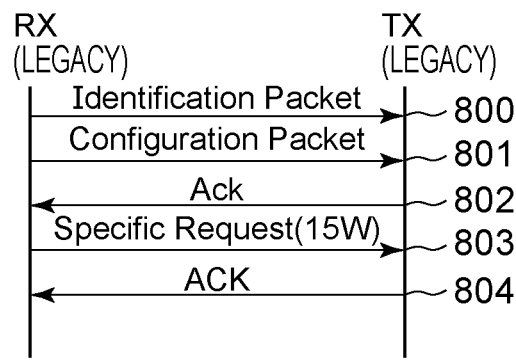
FIG. 8A is a diagram illustrating an example sequence for communication between a power transmitting apparatus having no WPT authentication function and a power receiving apparatus having no WPT authentication function.
Figure 8B:
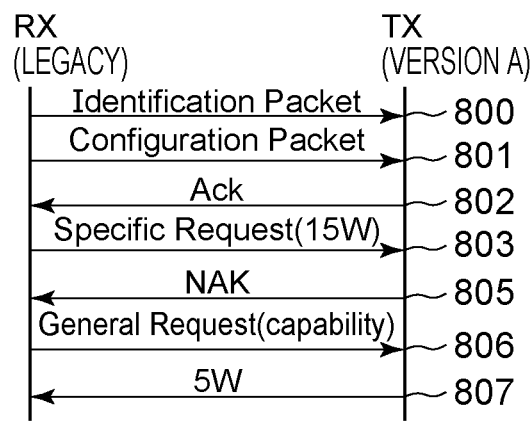
FIG. 8B is a diagram illustrating an example sequence for communication between a power transmitting apparatus having a WPT authentication function and a power receiving apparatus having no WPT authentication function.
Figure 8C:
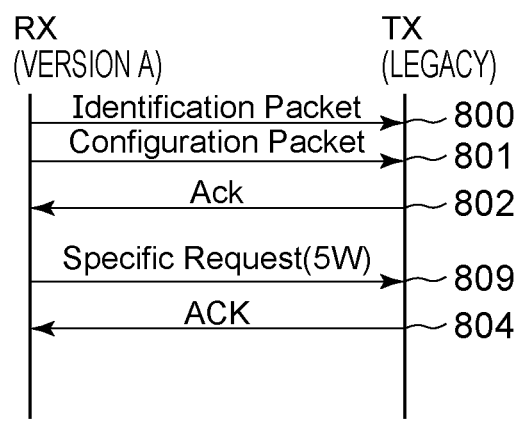
FIG. 8C is a diagram illustrating an example sequence for communication between a power transmitting apparatus having no WPT authentication function and a power receiving apparatus having a WPT authentication function.
Figure 8D:
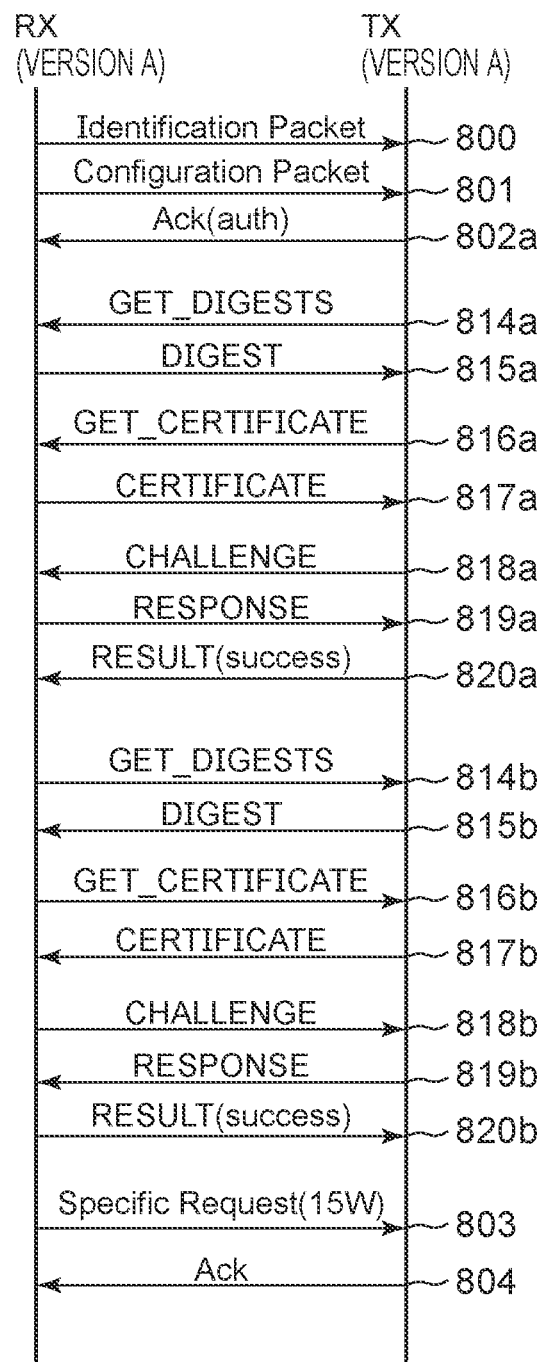
FIG. 8D is a diagram illustrating an example sequence for communication between a power transmitting apparatus having a WPT authentication function and a power receiving apparatus having a WPT authentication function.

The notification of the reason may be a RESULT packet described below (see 820a and 820b in FIG. 8D). In this embodiment, the control unit 101 of the TX 100 transmits, to the control unit 201 of the RX 200, a RESULT packet storing the result of WPT authentication and the result of USB authentication relating to the power supply unit 102 of the TX 100. For example, the control unit 101 provides the RESULT packet with 1 bit for storing the WPT authentication result such that "1" is stored for successful WPT authentication or "0" is stored otherwise.

Further, the control unit 101 provides the RESULT packet with 1 bit for storing the result of USB authentication with the AC adapter 301 and the USB cable 300 such that "1" is stored for successful USB authentication or "0" is stored otherwise. The control unit 101 transmits a RESULT packet in which the result of device authentication is stored in the manner described above.

The USB authentication result to be transmitted from the TX 100 to the RX 200 will now be described in detail. The USB authentication result is data indicating the result of USB authentication of the TX 100. In one example, the USB authentication result is transmitted by using a Power Transmitter Capability Packet based on the WPC standard v1.2.2, as illustrated in FIG. 10B. For example, in the packet configuration illustrated in FIG. 10B, at least either bit 6 and bit 7 (1100) in Bank 1 or bits 2 to 7 (1011) in Bank 2, which are "Reserved", can be used for the transmission of the USB authentication result. The TX 100 transmits a packet in which these bits store at least any one of "whether the function of sending a notification of the USB authentication result exists", "whether USB authentication is completed", and "the result of USB authentication".

Likewise, the control unit 201 of the RX 200 transmits, to the control unit 101 of the TX 100, a RESULT packet storing the result of WPT authentication. For example, the control unit 201 provides the RESULT packet with 1 bit for storing the WPT authentication result such that "1" is stored for successful WPT authentication or "0" is stored otherwise. The control unit 201 transmits a RESULT packet storing the result of device authentication in the manner described above.

Thereafter, the control unit 101 of the TX 100 and the control unit 201 of the RX 200 execute the processing of the Calibration phase (413) and causes a transition to the PT phase. In the PT phase, power is transmitted from the TX 100 to the RX 200 (414). The RX 200 supplies power to the load on the basis of the received power. The control unit 201 of the RX 200 may display power limit on the display unit 202 in accordance with the notification of the reason (415b). Likewise, the control unit 101 of the TX 100 may display power limit on the display unit 106 in accordance with the notification of the reason (415*a*).

For example, the message "low-speed charging is in progress because of failed USB authentication (caused by the USB device)" may be displayed on the basis of the bit indicating the USB authentication result or the WPT authentication result in the RESULT packet. As a result of the negotiation, if the GP is determined to be 0 watts, that is, if no power transmission is performed, the message "no charging is performed because of failed USB authentication (caused by the USB device)" may be displayed. With the display described above, the user can know that a longer time is taken for charging than when the power is not limited, or can take measures such as replacing the USB cable or USB adapter with a product supporting USB authentication. The display described above may indicate the result of WPT authentication. Even in this case, similar advantages are achieved.

As a result of the negotiation, if the transmission power is not limited, the message "high-speed charging is in progress" may be displayed. The display described above may be performed by using different LED colors or illumination patterns depending on the case where the transmission power is limited, the case where the transmission power is not limited, and the case where charging is not performed. Alternatively, in these cases, different sounds or vibrations may be used to notify the user, thereby achieving similar advantages.

In this embodiment, in USB authentication, the TX 100 is activated after the determination of whether to limit the transmission power. Alternatively, the USB device and the contactless charging system may be simultaneously activated to perform USB authentication and WPT authentication asynchronously. In this case, if the limiting of the transmission power by USB authentication is recognized after the TX 100 starts power transmission, limiting the transmission power of the contactless charging system by a Negotiation again can achieve similar advantages.

It should be noted that, as in this embodiment, the TX 100 for WPT authentication may be activated after the determination of whether to limit the transmission power in USB authentication, thereby expecting further advantages. When the TX 100 determines the GP in the Negotiation phase (411), it has already been determined in USB authentication whether to limit the transmission power. Thus, there is no need to perform processing for performing a Negotiation again, and the processing can be simplified.

(Operation of WPT Authentication and Backward Compatibility)

When larger power is to be transmitted in accordance with the WPC standard, as described above, it is considered to add the specification of the WPT authentication function to avoid the occurrence of an issue such as excessive heat generation to the existing WPC standard. It is important that a TX having a WPT authentication function can correspond to an RX having a similar WPT authentication function and can ensure backward compatibility with a legacy RX. It is also important that an RX having a WPT authentication function ensures backward compatibility with a legacy TX. However, a technique is not known for taking into account backward compatibility by adding the WPT authentication function while complying with the legacy WPC standard.

Figure 7:
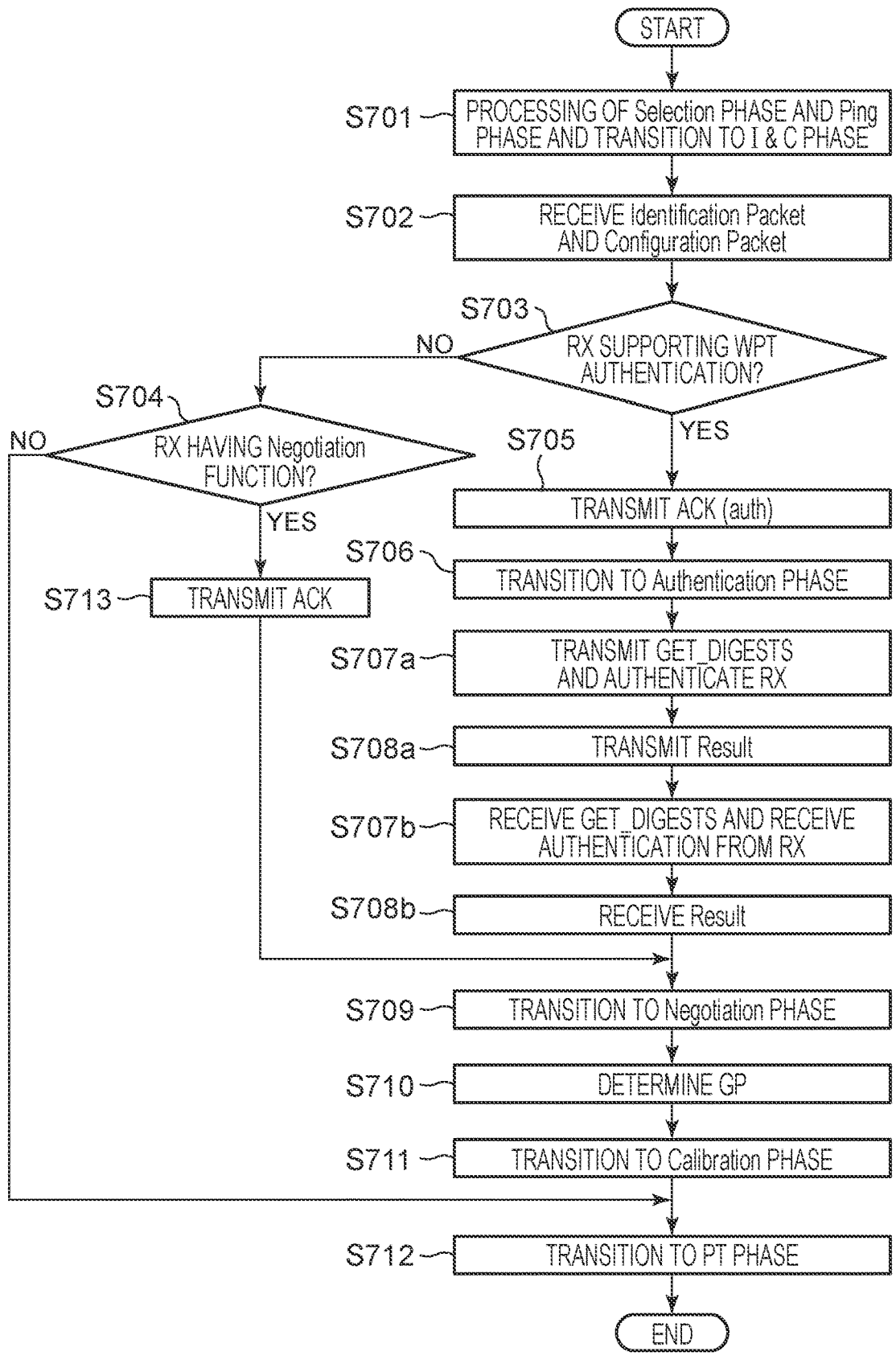
FIG. 7 is a flowchart illustrating example state transitions made by the control unit of the power transmitting apparatus up to power transmission.

FIG. 7 illustrates an example procedure of a process of the control unit 101 of the TX 100 according to this embodiment. FIG. 8 includes sequence charts describing backward compatibility by the version-A-supporting or legacy TX 100 or RX 200. In the following, a description will be made assuming that WPT authentication is challenge-response device authentication using a digital certificate, like USB authentication, although this is not intended to be limiting. The TX 100 operates an initiator that transmits a challenge text to the RX 200, and the RX 200 operates as a responder that encrypts the challenge text and transmits the encrypted challenge text to the TX 100. Likewise, when the RX 200 operates as an initiator that transmits a challenge text to the TX 100, the TX 100 operates as a responder that encrypts the challenge text and transmits the encrypted challenge text to the RX 200. The initiator refers to a device that performs WPT authentication, and the responder refers to a device that receives WPT authentication.

Figure 9:
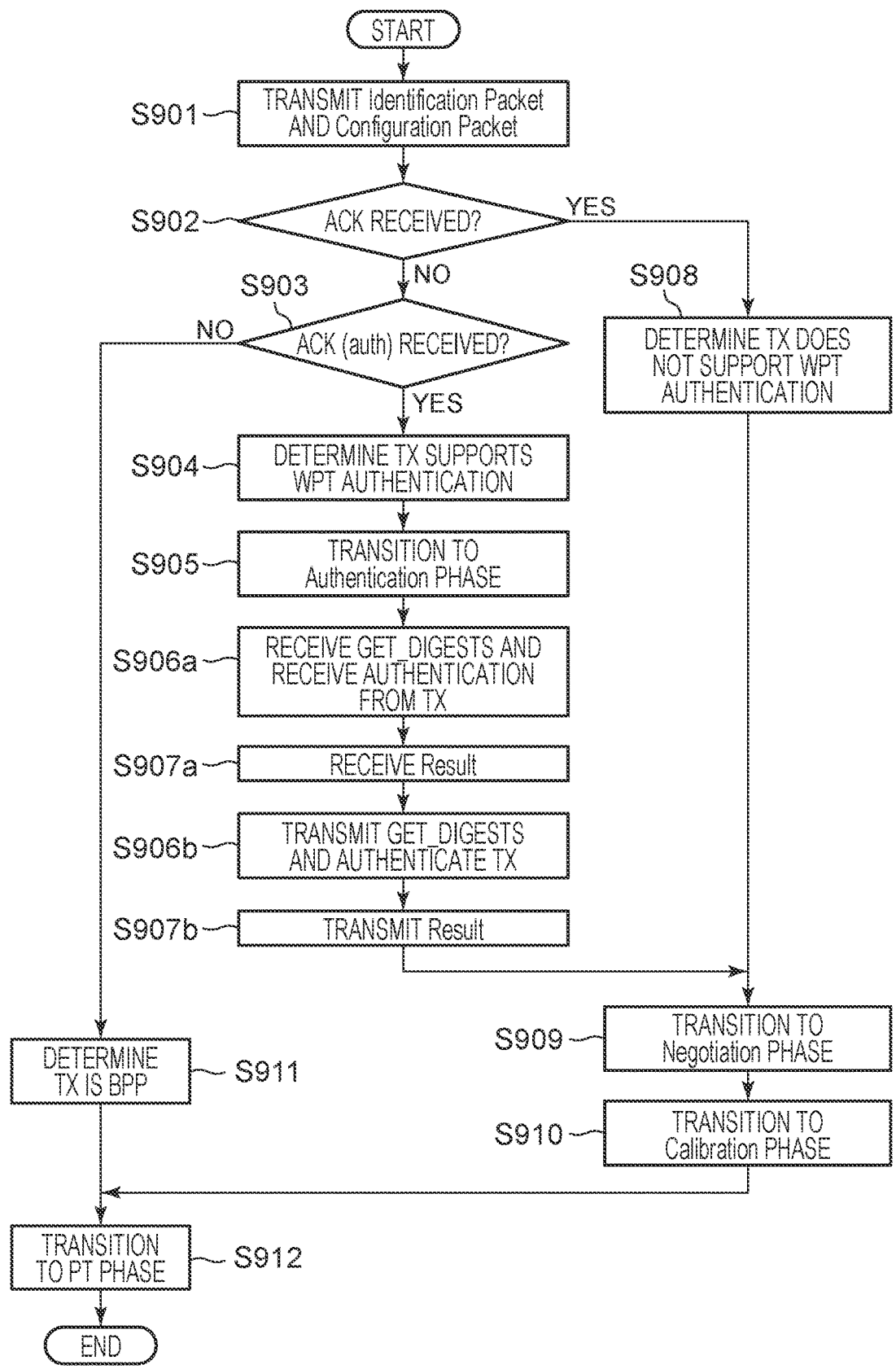
FIG. 9 is a flowchart illustrating example state transitions made by the control unit of the power receiving apparatus up to power transmission.

FIG. 9 is a flowchart illustrating the operation of the control unit 201 of the RX 200. FIG. 10A is a diagram illustrating an example bit configuration of a Configuration Packet based on the WPC standard.

First, categories of TXs and RXs based on the WPC standard v1.2.2 will be described prior to the description of the procedure of each process. TXs and RXs with a GP of 5 watts are categorized as Basic Power Profile (BPP). TXs and RXs with a GP greater than 5 watts and less than or equal to 15 watts are categorized as Extended Power Profile (EPP). In the WPC standard v1.2.2, furthermore, the function of performing a negotiation between a TX and an RX regarding the GP is added, and the TXs and RXs categorized as EPP have the Negotiation function. The TXs and RXs categorized as BPP are further categorized into devices supporting the Negotiation function and devices not supporting the Negotiation function.

A TX can determine whether an RX has the Negotiation function, by using the value of a Neg bit (Bank 4, bit 7) in a Configuration Packet (FIG. 10A) containing settings information of the RX. The Neg bit "1" indicates that the RX has the Negotiation function, and the Neg bit "0" indicates that the RX does not have the Negotiation function. In this embodiment, it is assumed that a legacy TX and RX have the Negotiation function and that a Negotiation is executed in the Negotiation phase, unless otherwise specified.

It is important that a TX and an RX based on the WPC standard version A supporting WPT authentication ensure backward compatibility with a legacy RX and TX supporting the WPC standard v1.2.2, respectively. That is, it is important that a TX supporting the WPC standard version A consistently operates also for an RX supporting a WPC standard prior to the version A, and an RX supporting the version A consistently operates also for a TX supporting a WPC standard prior to the version A.

Accordingly, the backward compatibility of the TX 100 and the RX 200, which support the version A according to this embodiment, with the WPC standard v1.2.2 will be described with reference to FIG. 7, FIG. 8, and FIG. 9. A TX and an RX supporting the legacy EPP of the WPC standard v1.2.2 causes a state transition in the order of the Selection phase, the Ping phase, the I & C phase, the Negotiation phase, the Calibration phase, and the PT phase. If at least any one of the legacy TX and RX is a BPP device that does not have the Negotiation function, the TX and the RX cause a state transition to the PT phase after the transition to the Selection phase, the Ping phase, and the I & C phase.

As described above, if both the TX and the RX support the Authentication phase, the TX and the RX cause a transition to the Authentication phase after the transition to the Selection phase, the Ping phase, and the I & C phase. After the transition to the Authentication phase, the TX and the RX cause a transition in the order of the Negotiation phase, the Calibration phase, and the PT phase.

The Authentication phase is executed prior to the Negotiation phase, for example. This is because, as described with reference to FIG. 6, the value of the GP changes depending on the result of WPT authentication. When the TX and the RX cause a transition to the Authentication phase after determining the GP by a negotiation in the Negotiation phase, the determined GP can be reset in accordance with the result of the Authentication phase. That is, after the GP is determined, it can be necessary to make a change to reduce the GP to avoid excessive heat generation or the like, depending on the result of WPT authentication. If the GP is re-changed in the way described above, the complexity of the procedure up to the transition to the PT phase can increase, or the time required for the procedure can be long. In contrast, the Authentication phase is executed prior to the Negotiation phase, thereby determining the GP in the Negotiation phase on the basis of the GP limited in the Authentication phase. Accordingly, limiting the GP in the Authentication phase prior to the Negotiation phase makes it possible to cause a quick transition to the PT phase without causing resetting of the GP until the transition to the PT phase.

[Case where Both TX 100 and RX 200 are Legacy]

First, an example process based on the WPC standard v1.2.2 when both the TX 100 and the RX 200 support the legacy EPP will be described with reference to FIG. 7, FIG. 8A, and FIG. 9. In the following, it is assumed that the TX 100 is successful in USB authentication with the USB cable 300 and the AC adapter 301. In this example process, only a portion of the flowcharts illustrated in FIG. 7 and FIG. 9 regarding the legacy EPP is used. That is, for the legacy TX 100, the processing of S703 to S708b in FIG. 7 is not present, and for the legacy RX 200, the processing of S903 to S907b and S908 in FIG. 9 is not present. In FIG. 8A, only the sequence after the I & C phase, which is related to backward compatibility, is illustrated.

After the processing of the Selection phase and the Ping phase is performed between the TX 100 and the RX 200, a transition to the I & C phase occurs (S701). In the I & C phase, the RX 200 transmits an Identification Packet (ID Packet) to the TX 100 (800 and S901). The ID Packet stores, in addition to individual identification information of the RX 200, an information element that specifies the version (in this case, v1.2.2) of the WPC standard supported.

Then, the RX 200 transmits a Configuration Packet to the TX 100 (801 and S901). The Configuration Packet based on the WPC standard v1.2.2 includes Maximum Power Value, which is a maximum power value that can be supplied from the RX 200 to the load, and a Neg bit, which is a bit indicating whether the RX 200 has the Negotiation function. Here, the RX 200 sets the Neg bit to "1", which indicates that the RX 200 has the Negotiation function.

Upon receipt of the ID Packet and the Configuration Packet from the RX 200 (S702), the TX 100 determines whether the RX 200 has the Negotiation function (S704). As described above, the legacy TX 100 does not execute the processing of S703 and proceeds to S704, which is processing corresponding to NO in S703. Since the RX 200 has the Negotiation function (YES in S704), the TX 100 transmits an ACK in response to the Configuration Packet (S713 and 802) and causes a transition to the Negotiation phase (S709).

If the RX 200 is BPP not supporting Negotiation (the Neg bit is 0) (NO in S704), the TX 100 causes a transition to the PT phase without transmitting an ACK (S712). If the TX 100 is BPP and does not support Negotiation, the TX 100 also causes a transition to the PT phase without transmitting an ACK. In this case, the GP is limited to 5 watts.

The RX 200 waits for the reception of an ACK in response to the Configuration Packet (S902). Upon receipt of an ACK (YES in S902), the RX 200 determines that the TX 100 supports the Negotiation function, and causes a transition to the Negotiation phase (S909). Here, as described above, the processing of S908 is not executed. Then, the RX 200 transmits a Specific Request packet representing a request for the power required therefor (for example, 15 watts). Specifically, the RX 200 transmits, to the TX 100, a Specific Request packet (Specific Request (15 W)) including an information element indicating a request for 15 watts as GP (803).

If no ACK is received within 15 ms from the transmission of the Configuration Packet (NO in S902), the RX 200 based on the WPC standard v1.2.2 determines that the TX 100 is BPP not having the Negotiation function (S911). Then, the RX 200 causes a state transition to the PT phase (S912). As described above, here, the processing of S903 is not executed.

Upon receipt of the Specific Request (15 W), the TX 100 compares the power transmitting capacity thereof and the requested amount of power (15 watts), and transmits a positive response (ACK) to the RX 200 if the requested amount of power can be transmitted. On the other hand, if the requested amount of power cannot be transmitted, the TX 100 transmits a negative response (NAK) to the RX 200. Here, the TX 100 determines that 15 watts of power can be transmitted, determines the GP to be 15 watts (S710), and transmits an ACK (804).

Then, the TX 100 causes a transition to the Calibration phase (S711). Upon receipt of an ACK from the TX 100 in response to the Specific Request transmitted in 803, the RX 200 causes a state transition to the Calibration phase (S910). In the Calibration phase, the TX 100 adjusts the power transmitted from the TX 100 to the RX 200 on the basis of the correlation between a value measured in the TX 100 and the value of the received power measured in the RX 200. After the Calibration phase is completed, the TX 100 and the RX 200 cause a state transition to the PT phase and start wireless power transmission (S712 and S912).

As described above, the TX 100 based on the WPC standard v1.2.2 determines, based on the Neg bit, whether the RX 200 is EPP or BPP having the Negotiation function or is BPP not having the Negotiation function. If the RX 200 is EPP or BPP having the Negotiation function, the TX 100 causes a state transition to the Negotiation phase and executes a negotiation regarding transmission power. Then, the TX 100 starts power transmission. On the other hand, if the RX 200 is BPP not having the Negotiation function, the TX 100 causes a transition to the PT phase without the transition to the Negotiation phase, and executes the transmission of relatively low power. If an ACK is received within 15 ms from the transmission of the Configuration Packet, the RX 200 based on the WPC standard v1.2.2 causes a transition to the Negotiation phase. If no ACK is received, the RX 200 causes a transition to the PT phase. The operation described above ensures the compatibility of the TX 100 and the RX 200 having the Negotiation function with the TX 100 and the RX 200 not having the Negotiation function in the WPC standard v1.2.2.

[Case where TX 100 Supports Version a and RX 200 is Legacy]

An example process in a case where the TX 100 supports the version A and the RX 200 is legacy will be described with reference to FIG. 6A, FIG. 7, FIG. 8B, and FIG. 10A. In the following, it is assumed that the TX 100 is successful in USB authentication with the USB cable 300 and the AC adapter 301. The following description entirely relates to backward compatibility in the WPC standard, and the following discussion is thus applicable even when the TX 100 has a configuration not including the first authentication unit 108.

First, an Auth bit in the Configuration Packet will be defined prior to the description of the procedure of the process. FIG. 10A is a diagram illustrating the configuration of the Configuration Packet in the WPC standard v1.2.2. Portions not related to the description in this embodiment will not be described. The Configuration Packet has a plurality of Reserved areas. Examples include a Reserved area 1000 of bits 0 to 7 in Bank 1, a Reserved area 1001 of bits 4 to 6 in Bank 2, and a Reserved area 1002 of bits 0 to 2 in Bank 4. In this embodiment, the Auth bit is arranged in bit 6 in Bank 2. However, the arrangement of the Auth bit is not limited to this, and the Auth bit may be arranged in any other Reserved area. In the WPC standard v1.2.2, all the bits in the Reserved areas are "0". The RX 200 stores "1" in the Auth bit when the RX 200 supports WPT authentication, and stores "0" in the Auth bit when the RX 200 does not support WPT authentication. Since the Auth bit is stored at a Reserved bit, even an RX supporting an old-generation standard that does not recognize the position at which the Auth bit is stored can store "0" as the value at this position.

The TX 100 determines, based on the Auth bit in the Configuration Packet, whether the RX 200 supports WPT authentication (S703). In this example process, the RX 200 is legacy, and thus the Auth bit is "0". Accordingly, the TX 100 determines that the RX 200 does not support WPT authentication (NO in S703).

If the RX 200 has the Negotiation function (YES in S704), the TX 100 transmits an ACK in response to the Configuration Packet (S713 and 802), and causes a transition to the Negotiation phase. Upon receipt of a request for 15 watts as GP from the RX 200 (803), the TX 100 transmits, to the RX 200, a NAK for rejecting the request (805). This is because since the RX 200 does not support WPT authentication, the TX 100 determines that 15 watts of power should not be transmitted to prevent the RX 200 from causing excessive heat generation or the like.

Since the request is rejected by the NAK, the RX 200 transmits a General Request, which is determined in the WPC standard v1.2.2, to know a value of the GP that can be set by the TX 100. In this embodiment, in the General Request, a message indicating a request for a Transmitter Capability Packet is represented by General Request (capability).

The TX 100 receives the General Request (capability) (806). Then, the TX 100 stores information indicating 5 watts of power in Guaranteed Power Value in the Power Transmitter Capability Packet and transmits the information to the RX 200 (807). A value of 5 watts is a value corresponding to not supporting WPT authentication (the row 603) and successful USB authentication (the column 602), on the basis of the settings illustrated in FIG. 6A, as the maximum value of the GP that can be allowed at the time of power transmission. The Transmitter Capability Packet is a packet defined in the WPC standard v1.2.2, including information on the maximum value of the GP that can be allowed in a Negotiation.

If the RX 200 does not have the Negotiation function (NO in S704), the TX 100 causes a transition to the PT phase without transmitting an ACK (S712). In this case, the GP is limited to 5 watts.

Since the RX 200 is legacy, the RX 200 performs the processing described in the [Case where both TX 100 and RX 200 are Legacy] section.

As described above, the Auth bit defined in this embodiment allows the TX 100 supporting the WPC standard version A to consistently operate also for a legacy RX supporting a WPC standard prior to the version A.

[Case where Both TX 100 and RX 200 Support Version A]

Next, a case where both the TX 100 and the RX 200 support WPT authentication processing will be described with reference to FIG. 6, FIG. 7, FIG. 8D, and FIG. 9. In the following, it is assumed that the TX 100 is successful in USB authentication with the USB cable 300 and the AC adapter 301. Prior to the description of the processing, the operation of the TX 100 and the RX 200 of the version A supporting WPT authentication will be described.

The RX 200 of the version A transmits, to the TX 100, a Configuration Packet storing "1" in the Auth Bit (801 and S901). If it is determined, based on the Auth Bit in the Configuration Packet, that the RX 200 supports WPT authentication (YES in S703), the TX 100 of the version A transmits an ACK (auth) to the RX 200 (S705 and 802a). The ACK (auth) is an acknowledge in response to the Configuration Packet having a bit pattern different from and distinguishable from the ACK and is a packet indicating that the TX 100 supports WPT authentication.

After the transmission of the ACK (auth), the TX 100 causes a transition to the Authentication phase (S706). On the other hand, upon receipt of an ACK (auth) rather than an ACK (NO in S902 and YES in S903), the RX 200 determines that the TX 100 supports WPT authentication (S904). Then, the RX 200 causes a transition to the Authentication phase (S905).

In FIG. 8D, 814a to 820a and 814b to 820b are an example of WPT authentication according to this embodiment. The TX 100 first transmits a GET_DIGESTS message to the RX 200 (814a and S707a). The RX 200 receives the GET_DIGESTS message (S906a). The GET_DIGESTS Packet is a Packet indicating a request for information relating to a digital certificate held by the RX 200. The RX 200 transmits a DIGEST in response to the GET_DIGESTS Packet (815a). The DIGEST is information relating to a digital certificate owned by the RX 200. Then, the TX 100 transmits, to the RX 200, a GET_CERTIFICATE Packet indicating a request for detailed information relating to the digital certificate (816a). The RX 200 transmits a CERTIFICATE in response to the GET_CETTIFICATE Packet (817a).

Then, the TX 100 transmits a CHALLENGE message including a challenge text to the RX 200 (818a). The RX 200 transmits, to the TX 100, a RESPONSE obtained by encrypting the challenge text (819a). The TX 100 transmits a RESULT (success) to the RX 200 when the validity of the RESPONSE is confirmed (820a and S708a). The RX 200 receives the RESULT (success) (S907a). The RESULT (success) packet indicates that, as a result of the RESPONSE, WPT authentication is successful. As a result of the RESPONSE, if authentication has failed, the TX 100 transmits a RESULT (fail) indicating a failure instead of the RESULT (success).

Then, the RX 200 transmits a GET_DIGESTS message to the TX 100 (814b and S906b). The TX 100 receives the GET_DIGESTS message (S707b). The GET_DIGESTS Packet is a Packet indicating a request for information relating to a digital certificate held by the TX 100. The TX 100 transmits a DIGEST in response to the GET_DIGESTS Packet (815*b*). The DIGEST is information relating to a digital certificate owned by the TX 100. Then, the RX 200 transmits, to the TX 100, a GET_CETTIFICATE Packet indicating a request for detailed information relating to the digital certificate (816*b*). The TX 100 transmits a CERTIFICATE in response to the GET_CETTIFICATE Packet (817*b*).

Then, the RX 200 transmits a CHALLENGE message including a challenge text to the TX 100 (818*b*), and the TX 100 transmits, to the RX 200, a RESPONSE obtained by encrypting the challenge text (819*b*). If the validity of the RESPONSE is confirmed, the RX 200 transmits a RESULT (success) to the TX 100 (820*b* and S907*b*). The TX 100 receives the RESULT (success) (S708*b*). The RESULT (success) packet indicates that, as a result of the RESPONSE, WPT authentication is successful. As a result of the RESPONSE, if authentication has failed, the RX 200 transmits a RESULT (fail) indicating a failure instead of the RESULT (success).

The TX 100 and the RX 200 transmit the RESULT (success) or the RESULT (fail), and cause a transition to the Negotiation phase upon receipt of the RESULT (success) or the RESULT (fail) (S709 and S909).

If USB authentication and mutual WPT authentication are successful, the TX 100 determines, based on FIG. 6A, 15 watts of power, which corresponds to successful WPT authentication (the row 605) and successful USB authentication (the column 602), to be the allowed maximum value of the GP, and performs a Negotiation. On the other hand, the RX 200 determines, based on FIG. 6B, 15 watts of power, which corresponds to successful WPT authentication (the row 615), to be the allowed maximum value of the GP, and performs a Negotiation. That is, the TX 100 is requested by the RX 200 to set the power value of the GP to 15 watts (803). Since the TX 100 has determined the power value of the GP to be 15 watts for a negotiation, the TX 100 transmits an ACK to the RX 200 to acknowledge the request (804).

If USB authentication or WPT authentication has failed, the TX 100 determines, based on FIG. 6A, the maximum value of the GP allowed in the Negotiation phase. If WPT authentication has failed, the RX 200 also determines, based on FIG. 6B, the maximum value of the GP allowed in the Negotiation phase. Upon receipt of the RESULT (fail), the TX 100 may not perform power transmission. Upon receipt of the RESULT (fail), the RX 200 may not perform a power transmission request.

With the configuration described above, content related to power transmission or power reception can be determined more accurately. An additional advantage of enhancing security is also achieved.

Accordingly, the TX 100 according to this embodiment consistently operates not only for an RX supporting a WPC standard prior to the version A but also for an RX supporting the version A.

While an example has been described in which the TX 100 first authenticates the validity of the RX 200 and then the RX 200 authenticates the validity of the TX 100 in the Authentication phase, validity authentication may be performed in the reverse order. That is, the RX 200 may first authenticate the TX 100, and then the TX 100 may authenticate the RX 200. In this case, in FIG. 8D, 814*a* to 820*a* and 814*b* to 820*b* are performed in the reverse order. Further, in FIG. 7, S707*a* and S708*a* are performed after S707*b* and S708*b*. Further, in FIG. 9, S906*a* and S907*a* are performed after S906*b* and S907*b*.

The order in which the TX 100 and the RX 200 perform authentication may be determined in advance or may not be determined. However, to correctly perform authentication in the Authentication phase, the initiator preferably performs the following operation after transmitting a GET_DIGESTS. Until the initiator transmits the RESULT (success) or the RESULT (fail) to the responder, the initiator suspends or stops responding even if the GET_DIGESTS is received from any other device. After the GET_DIGESTS is received, on the other hand, the responder preferably performs the following operation. Until the RESULT (success) or the RESULT (fail) is received, the responder does not transmit the GET_DIGESTS.

Here, the time interval between packets from GET_DIGESTS (814*a* and 814*b*) to RESULT (success) (820*a* and 820*b*) will be supplemented. For example, in the Negotiation phase of the WPC standard v1.2.2, it is specified that the TX 100 responds to a packet from the RX 200 such that the time from the rear end of the received packet to the front end of the response packet to be transmitted is within 10 ms. However, the initiator in the Authentication phase needs to perform encryption and decryption processing to confirm the validity of the packets (DIGEST, CERTIFICATE, and RESPONSE) related to the digital certificate, which are transmitted from the responder. Thus, time is taken to make a response in the Authentication phase. In the Authentication phase, therefore, a longer response time than the response time specified in any other phase is provided. In this embodiment, the response time is set to 50 ms. In FIG. 8D, the response time includes a time period from the DIGEST to the GET_CERTIFICATE, a time period from the CERTIFICATE to the CHALLENGE, and a time period from the RESPONSE to the RESULT (success). An increase in the response time reduces the need for the control unit 101 of the TX 100 to operate at high speeds, achieving an advantage of reducing the power consumption of the control unit 101 and achieving low cost due to the use of a low-speed CPU.

While the TX 100 determines, based on the Auth bit in the Configuration Packet, whether the power receiving apparatus supports WPT authentication, the determination may be based on version information of the ID Packet. If the version information indicates the version A (or a later version), it is determined that WPT authentication is supported. If the version information indicates a version prior to the version A, it is determined that WPT authentication is not supported. Similar advantages are achieved.

In the Authentication phase, upon receipt of a packet other than predetermined packets from the RX 200, the TX 100 may stop the power transmission of the power transmitting unit 103 and cause a transition to the Selection phase. With this operation, stopping power transmission upon receipt of a packet other than predetermined packets due to a failure of the RX 200 or the like can prevent the system from performing an unwanted operation. The predetermined packets include the GET_DIGESTS, the DIGEST, the GET_CERTICARTE, the CERTIFICATE, the CHALLENGE, the RESPONSE, and the RESULT, which are indicated by 814*a* to 820*a* and 814*b* to 820*b*. Examples of the packet other than the predetermined packets include a Signal Strength Packet indicating the voltage value of the received voltage, a Control Error Packet indicating a request for an increase or decrease in the voltage value, an ID Packet, and a Configuration Packet.

Further, the TX 100 and the RX 200 may store a result of operating as an initiator (i.e., confirming the validity of a responder) and identification information of a responder (such as the device ID, the manufacturer ID, and information relating to the certificate) in a non-volatile memory (not illustrated). Only identification information of a responder for which authentication has failed may be stored in the non-volatile memory. The TX 100 and the RX 200 may perform WPT authentication by using the identification information of a responder for which authentication has failed, which is stored in the non-volatile memory. For example, when the TX 100 and the RX 200 perform authentication as initiators, the identification number of a target device that is to perform authentication is checked against the identification number stored in the non-volatile memory, and the identification number of the device can be used to determine the validity of the device.

[Case where TX is Legacy and RX Supports Version A]

A case where the TX 100 is legacy and the RX 200 supports the version A will be described with reference to FIG. 6, FIG. 7, FIG. 8C, and FIG. 9. In the following, it is assumed that the TX 100 is successful in USB authentication with the USB cable 300 and the AC adapter 301. First, the operation of the RX 200 supporting the version A will be described.

First, the RX 200 notifies the TX 100 that the RX 200 supports WPT authentication by using the Configuration Packet (801 and S901). However, the TX 100 is legacy and ignores the Auth bit. Since the RX 200 of the version A supports the Negotiation function, the TX 100 transmits an ACK and causes a transition to the Negotiation phase (YES in S704, S713, and S709).

Upon receipt of the ACK (802 and YES in S902), the RX 200 determines that the TX 100 does not support WPT authentication (S908). This is because since the RX 200 supports WPT authentication, the RX 200 would receive an ACK (auth) rather than an ACK if the TX 100 were supporting WPT authentication. Then, the RX 200 causes a transition to the Negotiation phase (S909).

If the RX 200 does not receive an ACK within 15 ms from the transmission of the Configuration Packet (NO in S902) or does not receive an ACK (auth) (NO in S903), the process proceeds to S911. In this case, the RX 200 determines that the TX 100 is BPP and does not support the Negotiation function (S911), and causes a transition to the PT phase (S912).

The RX 200 performs a negotiation of the GP in the Negotiation phase. As described with reference to FIG. 6B, the RX 200 determines that the reception at 15 watts should be avoided to avoid a risk of excessive heat generation or the like. Then, the RX 200 determines that about 5 watts of power, which corresponds to not supporting WPT authentication (the row 603) and successful USB authentication (the column 602), are negotiated as the GP, and transmits a Specific Request (5 W) (809). Then, the RX 200 receives an ACK from the TX 100 (804), and terminates the Negotiation phase. Then, the RX 200 causes a transition to the Calibration phase (S910), and performs predetermined processing. Then, the RX 200 causes a transition to the PT phase (S912).

As described above, the RX 200 supporting the WPC standard version A can consistently operate also for the TX 100 supporting a WPC standard prior to the version A.

As described above, in the contactless charging system according to this embodiment, device authentication using the USB protocol is performed between the power supply apparatus (the AC adapter 301) serving as a power supply source and the power transmitting apparatus, and device authentication using the WPC protocol is mutually performed between the power transmitting apparatus and the power receiving apparatus. The power receiving apparatus controls the transmission power of the power transmitting apparatus of WPC on the basis of the USB-based device authentication result and the WPC-based device authentication result. Accordingly, in wireless power transmission in which a plurality of types of device authentication protocols are executable, these authentication results can be efficiently used. As a result, appropriate power transmission control can be implemented such that, for example, an issue such as excessive heat generation is less likely to occur in a device present in a path for power supply.

Embodiment 2

Figure 11:
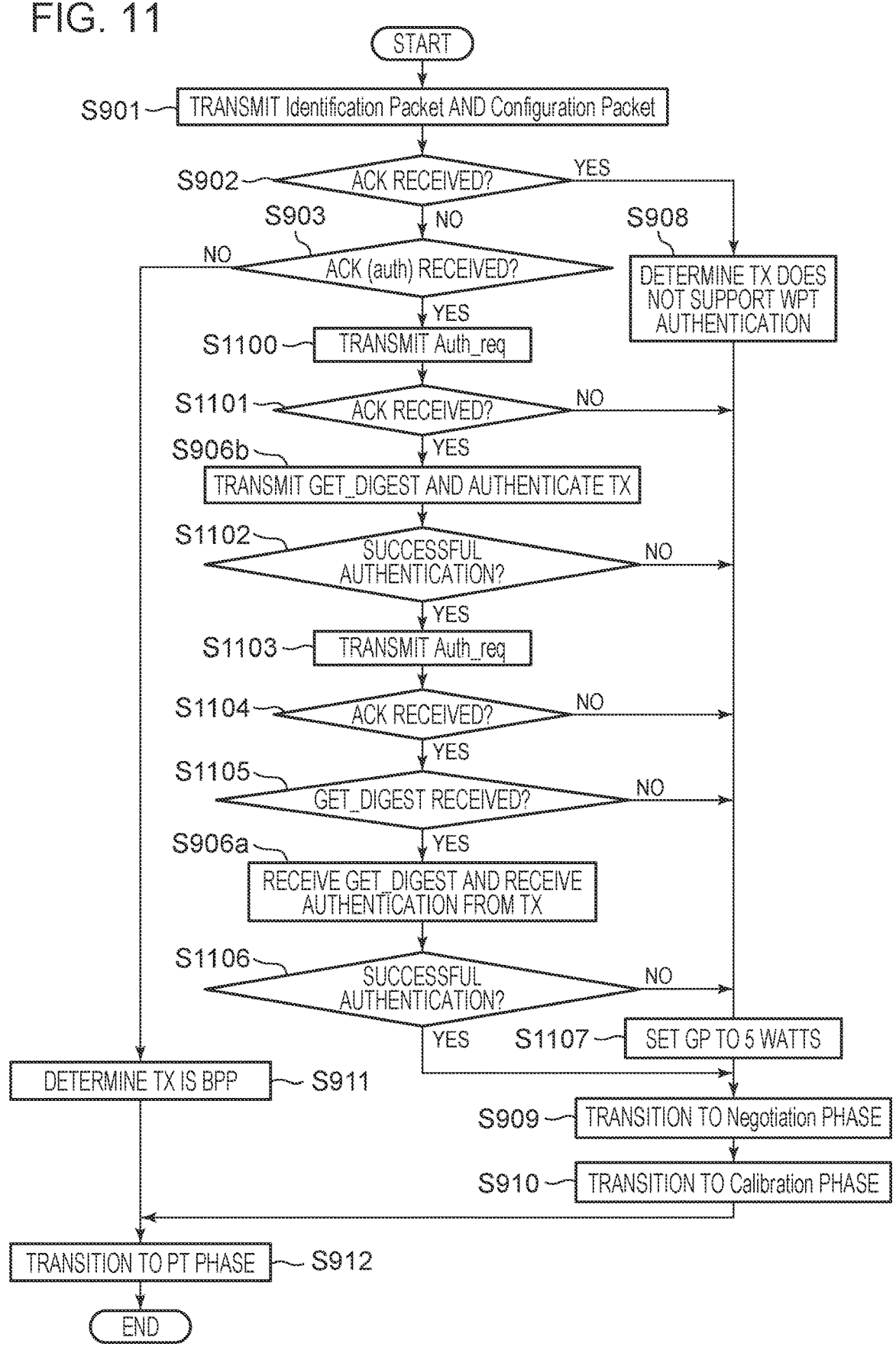
FIG. 11 is another example of the flowchart illustrating state transitions made by the control unit of the power receiving apparatus up to power transmission.

The following describes another embodiment of the present disclosure with reference to FIG. 11 and FIG. 12. Embodiment 1 provides an example in which the power transmitting apparatus and the power receiving apparatus mutually perform WPT authentication in the Authentication phase. This embodiment provides an example process in which if the earlier performed WPT authentication among the respective WPT authentications performed by the power transmitting apparatus and the power receiving apparatus is not successful, the GP is determined without performing the other WPT authentication to be performed subsequently. Accordingly, the processing time in the Authentication phase can be shortened, and the GP can be determined quickly.

In this embodiment, furthermore, the control unit 101 of the TX 100 determines content related to power transmission on the basis of at least the result of the earlier performed WPT authentication. For example, the content is whether to perform power transmission. In the case of power transmission, the content is the allowable maximum value of the power value. On the other hand, the control unit 201 of the RX 200 determines content related to power reception on the basis of at least the result of the earlier performed WPT authentication. For example, the content is whether to perform power reception. In the case of power reception, the content is the maximum value of the power value for which a request is made to the TX 100.

While this embodiment will be described using a case where the power receiving apparatus initially operates as an initiator and authenticates the validity of the power transmitting apparatus, the power transmitting apparatus may initially operate as an initiator. Similar advantages are achieved. FIG. 11 is a flowchart illustrating state transitions made by the control unit of the power receiving apparatus (the RX 200) up to power transmission. FIG. 12 is a flowchart illustrating state transitions made by the control unit of the power transmitting apparatus (the TX 100) up to power transmission.

The following description focuses on processing in the Authentication phase, and a description will be made using a case where both the TX 100 and the RX 200 are of the version A. The same points as those in the embodiment described above will not be described. The same elements as the elements described in the foregoing embodiment are denoted by the same numerals and will not be described.

The RX 200 of the version A transmits, to the TX 100, a Configuration Packet storing "1" in the Auth Bit (S901). If it is determined, based on the Auth Bit in the Configuration Packet, that the RX 200 supports WPT authentication (YES in S703), the TX 100 of the version A transmits an ACK (auth) to the RX 200 (S705). The RX 200 receives the ACK (auth) (YES in S903). In this case, since it is found that the TX 100 supports WPT authentication, the RX 200 transmits an Auth_request (hereinafter referred to as "Auth_req") to the TX 100 within a predetermined time after the receipt of the ACK (auth) (S1100). The Auth_req is a packet indicating an intention to start authentication processing in which the RX 200 serves as an initiator and the TX 100, which is the transmission destination, serves as a responder.

After the transmission of the ACK (auth) in S705, the TX 100 determines whether an Auth_req packet has been received within a predetermined time (S1200). The TX 100 receives the Auth_req packet, thereby recognizing the start of WPT authentication. The RX 200 may determine whether the TX 100 supports WPT authentication by using a method other than receiving an ACK (auth), such as acquiring version information.

Upon receipt of the Auth_req (YES in S1200), the TX 100 determines whether the TX 100 can operate as a responder and perform WPT authentication. Specifically, the determination is made in terms of the state of load of the control unit 101 of the TX 100. More specifically, it is determined whether the control unit 101 has a capacity of controlling the second authentication unit 109, or, if the second authentication unit 109 is controlled by any other control unit (not illustrated) connected to the RX 200, it is determined whether the other control unit is capable of controlling the second authentication unit 109.

After receipt of the Auth_req packet, the TX 100 performs the determination described above within a predetermined time. If it is determined that the TX 100 can be authenticated as a responder, the TX 100 transmits an ACK to the RX 200 in response to the Auth_req (YES in S1201). Accordingly, the TX 100 causes a transition to the Authentication phase (S706). Upon receipt of the ACK (YES in S1101), the RX 200 transmits a GET_DIGESTS to the TX 100 within a predetermined time after the reception of the ACK, and authenticates the validity of the TX 100 (S906*b*). Then, the TX 100 receives the GET_DIGESTS from the RX 200, and receives the authentication processing performed by the RX 200 (S707*b*).

Then, if it is determined that the result of WPT authentication indicates success (YES in S1102) and that the TX 100 supports WPT authentication, the RX 200 transmits a RESULT (success) to the TX 100. The TX 100 receives the RESULT (success) packet from the RX 200, thereby recognizing that authentication is successful. In this case, the TX 100 waits for a predetermined time until an Auth_req packet is transmitted from the RX 200 to inquire whether the TX 100 has an intention to perform authentication processing in which the TX 100 serves as an initiator and the RX 200 serves as a responder.

Then, the RX 200 transmits an Auth_req to the TX 100 within a predetermined time after the transmission of the RESULT (success) to inquire whether the TX 100 has an intention to perform WPT authentication on the RX 200 (S1103). If the WPT authentication of the TX 100 by the RX 200 is successful (YES in S1202), the TX 100 receives the Auth_req transmitted from the RX 200 within a predetermined time (YES in S1203). Since the TX 100 has the function of the initiator, the TX 100 transmits an ACK within a predetermined time after the reception of the Auth_req packet (YES in S1204). The RX 200 receives the ACK (YES in S1104).

The TX 100 transmits a GET_DIGESTS to the RX 200 within a predetermined time after the transmission of the ACK to start WPT authentication to authenticate the validity of the RX 200 (S707*a*). The RX 200 receives the GET_DIGESTS, and authentication performed by the TX 100 is started (YES in S1105, and S906*a*).

If WPT authentication for the RX 200 is successful (YES in S1205), the TX 100 transmits a RESULT (success) packet to the RX 200 and causes a transition to the Negotiation phase (S709). Since the TX 100 also confirms the validity of the RX 200 (YES in S1205), a GP of up to 15 watts is allowed on the basis of FIG. 6A. That is, the control unit 101 of the TX 100 determines, as content related to power transmission, a transmission power value allowable for the RX 200 at the time of power transmission on the basis of the results of both WPT authentications.

On the other hand, the RX 200 receives the result of WPT authentication from the TX 100, and, if authentication is successful (YES in S1106), causes a transition to the Negotiation phase (S909). Since the RX 200 confirms the validity of the TX 100 (YES in S1102), the RX 200 sends to the TX 100 a request for a GP of up to 15 watts as a Specific Request on the basis of FIG. 6B. That is, the control unit 201 of the RX 200 determines, as content related to power reception, the maximum value of the power value for which a request is made to the TX 100 on the basis of the results of both WPT authentications.

If the validity of the TX 100 is not confirmed in the processing of S907*b*, that is, if WPT authentication is not successful (NO in S1102), the RX 200 limits the GP to 5 watts (S1107). If WPT authentication is not successful in the processing of S707*b* (NO in S1202), the TX 100 limits the GP to 5 watts (S1206). That is, the control unit 201 of the RX 200 determines, as content related to power reception, the power value for which a request is made to the TX 100 by the RX 200 on the basis of the result of the earlier performed WPT authentication. The control unit 101 of the TX 100 also determines, as content related to power transmission, the transmission power value allowable for the RX 200 at the time of power transmission on the basis of the result of the earlier performed WPT authentication.

While an example is provided in which the RX 200 and the TX 100 determine the GP to be 5 watts, this is not intended to be limiting. Specifically, examples of the content related to power reception, which is determined by the RX 200 if WPT authentication is not successful, include the following items: sending from the RX 200 to the TX 100 a request for a smaller power value than that when mutual WPT authentication is successful, or not receiving power from the TX 100. Examples of not receiving power from the TX 100 include requesting the TX 100 to stop power transmission. Accordingly, for example, a packet indicating a stop of power transmission may be transmitted to stop power transmission, and no request may be made for power. Alternatively, the RX 200 may block a current path (not illustrated) so as not to cause a current to flow through the power receiving coil 205 to prevent the RX 200 from receiving power from the TX 100. Accordingly, excessive heat generation or the like can be prevented.

Examples of the content related to power transmission, which is determined by the TX 100 if WPT authentication is not successful, include the following items: the TX 100 setting the maximum value of the allowed power to be transmitted to the RX 200 to be a smaller value than that when mutual WPT authentication is successful, or stopping the transmission of power to the RX 200. Accordingly, excessive heat generation or the like can be prevented.

As illustrated in FIG. 11 and FIG. 12, if the earlier performed WPT authentication processing (S707*b* and S906*b*) is not successful, the control unit 101 and the control unit 201 control the authentication processing so that the WPT authentication processing to be performed subsequently (S707*a* and S906*a*) is not performed. Specifically, the control unit 201 of the RX 200 does not provide an opportunity to cause the TX 100 to operate as an initiator. More specifically, the control unit 201 of the RX 200 does not transmit the Auth_req in S1103. This is because since the RX 200 is not successful in authentication in which the RX 200 serves as an initiator, the RX 200 has determined the requested GP to be 5 watts (see FIG. 6B). This determination is not changed, regardless of whether the result of authentication in which the TX 100 serves as an initiator indicates success. Accordingly, the processing time in the Authentication phase can be shortened, and a quick transition to the Negotiation phase can occur.

Specific examples of the case where WPT authentication is not successful include the following cases. For example, the validity of the TX 100 is not confirmed in WPT authentication processing in which the RX 200 serves as an initiator, that is, authentication has failed (NO in S1102).

Also when a NAK indicating negation is transmitted as a response to the Auth_req since it is not possible to cause the second authentication unit 109 to operate, the TX 100 determines that the RX 200 is not successful in authentication (NO in S1101 and NO in S1201). Also when the RX 200 does not receive an ACK from the TX 100 within a predetermined time after the transmission of the Auth_req, it is determined that the RX 200 is not successful in authentication (NO in S1201).

Further, in WPT authentication processing, when the RX 200 does not receive an expected packet from the TX 100 within a predetermined time after the transmission of a packet described below, it is also determined that the RX 200 is not successful in authentication. Specific examples include a case where the DIGEST packet is not received or any other packet is received in response to the GET_DIGESTS packet transmitted from the RX 200. Other examples include a case where the CERTIFICATE is not received or any other packet is received in response to the GET_CERTIFICATE packet, and a case where the RESPONSE packet is not received or any other packet is received in response to the CHALLENGE packet.

On the other hand, if the TX 100 determines that WPT authentication is not successful, the control unit 101 of the TX 100 does not transmit a packet relating to the processing of WPT authentication for the RX 200, such as not transmitting a GET_DIGESTS to the RX 200.

Examples of the case where the TX 100 determines that WPT authentication is not successful include the following cases. After the transmission of the ACK (auth) (S705), the TX 100 does not receive the Auth_req packet within a predetermined time (NO in S1200). Other examples include a case where after the reception of the Auth_req packet (YES in S1200), the TX 100 does not transmit an ACK within a predetermined time (NO in S1201).

Further, in the WPT authentication processing, when the TX 100 does not receive an expected packet from the RX 200 within a predetermined time after the transmission of a packet described below, the TX 100 also determines that authentication is not successful. Specific examples include a case where after the transmission of the ACK (S1201), the TX 100 does not receive the GET_DIGESTS packet or receives any other packet. Other examples include a case where after the transmission of the DIGEST packet, the TX 100 does not receive the GET_CERTIFICATE packet or receives any other packet. Other examples include a case where after the transmission of the CERTIFICATE packet, the TX 100 does not receives the CHALLENGE packet or receives any other packet. Other examples include a case where after the transmission of the RESPONSE packet, the TX 100 does not receive the RESULT packet or receives any other packet, and a case where WPT authentication in which the RX 200 serves as an initiator is not successful (NO in S1202). The case where WPT authentication is not successful includes a case where after the transmission of the RESPONSE packet, the TX 100 does not receive the RESULT (success) packet within a predetermined time. Other examples include a case where the TX 100 receives a RESULT (fail) packet indicating that authentication has failed.

Likewise, in the processing of S707a (S906a), if the authentication of the RX 200 in which the TX 100 serves as an initiator is not successful (NO in S1205 and NO in S1106), processing is performed as follows. In the Negotiation phase, the RX 200 sends to the TX 100 a request for, as the GP, a smaller power value than that when mutual WPT authentication is successful. Alternatively, the RX 200 requests the TX 100 to stop power transmission, and determines processing such as making no request for power. On the other hand, in the Negotiation phase, the TX 100 determines processing such as allowing a smaller power value than that when mutual WPT authentication is successful as the GP or stopping the transmission of power to the RX 200. In FIG. 11, the RX 200 determines the GP to be 5 watts (S1107), and in FIG. 12, the TX 100 determines the GP to be 5 watts (S1206).

Examples of the case where the RX 200 determines that WPT authentication is not successful include the following cases. Specific examples include a case where after the transmission of the Auth_Req in S1103, the RX 200 does not receive an ACK from the TX 100 within a predetermined time (NO in S1104). Other examples include a case where after the reception of the ACK (YES in S1104), the GET_DIGESTS is not received within a predetermined time (NO in S1105).

Also, in the WPT authentication processing, when the RX 200 does not receive an expected packet from the TX 100 within a predetermined time after the transmission of a packet described below, the RX 200 also determines that authentication is not successful. Specific examples include a case where after the transmission of the DIGEST packet, the RX 200 does not receive the GET_CERTIFICATE packet or receives any other packet. Other examples include a case where after the transmission of the CERTIFICATE packet, the RX 200 does not receive the CHALLENGE packet or receives any other packet, and a case where after the transmission of the RESPONSE packet, the RX 200 does not receive the RESULT packet or receives any other packet.

Examples of a case where the TX 100 determines that WPT authentication is not successful include the following cases. After the reception of the RESULT (success) packet, the TX 100 does not receive the Auth_req packet within a predetermined time (NO in S1203). Other examples include a case where the TX 100 does not transmit an ACK within a predetermined time in response to the Auth_req packet (NO in S1204) or transmits a NAK indicating that it is not possible to cause the second authentication unit 109 to operate.

Further, in the WPT authentication processing in S707a, if the TX 100 does not receive an expected packet from the RX 200 within a predetermined time after the transmission of a packet described below, the TX 100 also determines that authentication is not successful (NO in S1205). Specific examples include a case where the TX 100 does not receive the DIGEST packet or receives any other packet in response to the GET_DIGESTS packet to be transmitted. Other examples include a case where the TX 100 does not receive the CERTIFICATE or receives any other packet in response to the GET_CERTIFICATE packet to be transmitted. Other examples include a case where the TX 100 does not receive the RESPONSE packet or receives any other packet in response to the CHALLENGE packet that is transmitted.

Further, in S1103, the RX 200 transmits an Auth_req to inquire whether the TX 100 has an intention to perform processing in which the TX 100 serves as an initiator and the RX 200 serves as a responder. However, the Auth_req may be transmitted after the determination of whether the TX 100 can become an initiator.

For example, the TX 100 may store, in a portion of the Transmitter Capability Packet, information indicating the presence of the function of the initiator or the presence of the function of the responder. Likewise, the RX 200 may store, in a portion of the Configuration Packet, information indicating the presence of the function of the initiator or the presence of the function of the responder. In S1103, the power receiving apparatus RX 200 may transmit an Auth_req if the TX 100 has the function as the initiator, and may not transmit an Auth_req if the TX 100 does not have the function as the initiator. This can shorten the time or the like taken to transmit an Auth_req although the TX 100 does not have the function as the initiator, thereby shortening the processing time.

The Auth_req in S1103 is a packet that triggers the TX 100 to transmit a GET_DIGESTS. The Auth_req may be a packet for inquiring whether the TX 100 has data to be transmitted to the RX 200 or a packet indicating that the right of transmitting data is provided to the TX 100. If the TX 100 has data to be transmitted to the RX 200 or the TX 100 wishes to have the right of transmitting data, the TX 100 responds with an ACK (S1204), or, otherwise, responds with a NAK, thereby achieving similar advantages.

Prior to the transmission of Auth_req in S1100, the RX 200 may transmit a General Request (ID), which is a packet for acquiring the identification information of the TX 100, to the TX 100 and acquire the identification information from the TX 100. Then, the RX 200 may store the identification information in the Auth_req packet as the identification information of the responder. This allows the TX 100 to find, upon receipt of the Auth_req, that the TX 100 should become a responder. Then, the TX 100 can wait for the reception of a GET_DIGESTS and can receive WPT authentication. The RX 200 may store the identification information thereof in the Auth_req packet as the identification information of the initiator or store the identification information of the TX 100 as the identification information of the responder. This allows the TX 100 to clarify who (in this case, the RX 200) and whom (in this case, the TX 100) to confirm the validity.

In S1103, the RX 200 stores the identification information thereof in the Auth_req packet as the identification information of the responder, and stores the identification information of the TX 100 as the identification information of the initiator. This allows the TX 100 to find, upon receipt of the Auth_req, that the TX 100 should become an initiator.

FIG. 11 and FIG. 12 relate to flowcharts for the control units of the RX 200 and the TX 100 when the RX 200 initially becomes an initiator and authenticates the validity of the TX 100. However, even when the TX 100 initially becomes an initiator and authenticates the validity of the RX 200, similar advantages are achieved. In this case, in the flowchart illustrating the processing of the control unit 201 of the RX 200, the series of processes of S1100, S1101, S906b, and S1102 and the series of processes of S1103, S1104, S1105, S906a, and S1106 in FIG. 11 are exchanged. In the flowchart illustrating the processing of the control unit 101 of the TX 100, the series of processes of S1200, S1201, S706, S707b, and S1202 and the series of processes of S1203, S1204, S707a, and S1205 in FIG. 12 are exchanged.

With the configuration described above, content related to power transmission or power reception can be determined more accurately. An additional advantage of enhancing security is also achieved.

Further, the TX 100 and the RX 200 according to the present disclosure have the function as the initiator in WPT authentication. In addition, the TX 100 and the RX 200 may store the result of operating as the initiator (i.e., confirming the validity of the responder) and the identification information of the responder (such as the device ID, the manufacturer ID, and information relating to the certificate) in the non-volatile memory (not illustrated). Further, only the identification information of a responder for which authentication has failed may be stored in the non-volatile memory. The TX 100 and the RX 200 may operate such that the same apparatus as the responder whose identification information is stored in the non-volatile memory does not perform authentication processing as the initiator. Specifically, upon receipt of a request from an apparatus whose identification information is stored in the non-volatile memory as a responder for which authentication has failed to operate as a responder and check the validity thereof, the TX 100 and the RX 200 operate so as to reject the request.

For example, when the RX 200 operates as an initiator and has failed in the authentication of the TX 100, the RX 200 stores in the non-volatile memory thereof the identification information of the TX 100 as a responder. Then, a packet for inquiring whether the TX 100 has data to be transmitted to the RX 200 or a packet for providing the right of transmitting data to the TX 100 is transmitted. Then, the RX 200 receives from the TX 100 an ACK, which is a response indicating that the TX 100 has the data to be transmitted or has obtained the right of transmitting data, in response to the transmitted packet. Upon receipt of a packet (Auth_req) indicating an intention to start WPT authentication processing in which the TX 100 serves as an initiator and the RX 200 serves as a responder, the RX 200 transmits a NAK as the response on the basis of the identification information stored in the non-volatile memory. This can prevent an apparatus (in this case, the TX 100) for which WPT authentication performed by the RX 200 has failed from performing authentication processing in which this apparatus operates as an initiator. That is, if the earlier performed WPT authentication is not successful, the subsequent WPT authentication can be prevented from being performed. Accordingly, if the validity is not recognized through the earlier performed WPT authentication, the processing time in the Authentication phase can be shortened.

The same applies when the TX 100 serving as an initiator has failed in the authentication of the RX 200. For example, the TX 100 is assumed to store the identification information of the RX 200 in the non-volatile memory as a responder for which authentication has failed. In this state, upon receipt of, from the RX 200, a packet (Auth_req) indicating an intention to start WPT authentication processing in which the RX 200 serves as an initiator and the TX 100 serves as a responder, the TX 100 transmits a NAK as the response. Even with the operation described above, an apparatus that has failed in authentication in which the apparatus operates as an initiator can be prevented from performing authentication processing, and thus the processing time in the Authentication phase can be shortened.

In addition, if the TX 100 and the RX 200 operate such that a device whose identification information is stored in the non-volatile memory as a responder for which authentication has failed is not permitted to make a request that the TX 100 and the RX 200 operate as responders and to confirm validity, similar advantages are achieved.

For example, the RX 200 having a function of transmitting a packet for inquiring whether the TX 100 has data to be transmitted to the RX 200 or a packet for providing the right of transmitting data to the TX 100 may be controlled in the following way. That is, the packet described above may not be transmitted to an apparatus (i.e., the TX 100) whose identification information is stored in the non-volatile memory as a responder for which authentication has failed.

The TX 100 having a function of transmitting a packet for inquiring whether the RX 200 has data to be transmitted to the TX 100 or a packet for providing the right of transmitting data to the RX 200 may be controlled in the following way. That is, the packet described above may not be transmitted to an apparatus (i.e., the RX 200) whose identification information is stored in the non-volatile memory as a responder for which authentication has failed.

Other Embodiments

The power transmission method for a wireless power transmission system according to the present disclosure is not limited to any specific method. A magnetic field resonance method can be used in which power is transmitted by coupling caused by resonance in a magnetic field created between a resonator (resonance element) of a TX and resonator (resonance element) of an RX. Alternatively, an electromagnetic induction method, an electric field resonance method, a microwave method, or a power transmission method using a laser or the like may be used.

The TX and the RX may be each, for example, an image input device such as an image capturing device (such as a camera or a video camera) or a scanner, or an image output device such as a printer, a copying machine, or a projector. Alternatively, the TX and the RX may be each a storage device such as a hard disk device or a memory device, or an information processing device such as a personal computer (PC) or a smartphone.

The flowcharts illustrated in FIG. 5, FIG. 7, FIG. 9, FIG. 11, and FIG. 12 are started, for example, when power is applied to the control unit 101 or the control unit 201. The processes illustrated in FIG. 5A, FIG. 7, and FIG. 12 are implemented by the control unit 101 executing a program stored in the memory 107 of the TX 100. The flowcharts illustrated in FIG. 5B, FIG. 9, and FIG. 11 are implemented by the control unit 201 executing a program stored in the memory 209 of the RX 200.

At least a portion of the processes illustrated in the flowcharts illustrated in FIG. 5, FIG. 7, FIG. 9, FIG. 11, and FIG. 12 may be implemented by hardware. In the case of hardware implementation, for example, a predetermined compiler may be used to automatically generate a dedicated circuit on an FPGA (Field Programmable Gate Array) from a program for implementing each step. In addition, a Gate Array circuit may be formed in a manner similar to that for the FPGA and implemented as hardware.

The present disclosure can reduce unnecessary processing caused when the validity of the target apparatus that performs authentication processing is not recognized.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A power receiving apparatus comprising:
a power receiving unit configured to wirelessly receive power from a power transmitting apparatus;
an authentication unit configured to mutually perform device authentications with the power transmitting apparatus; and
a control unit configured to determine content related to power reception on the basis of a result of a performed device authentication, wherein
the control unit is capable of performing control such that in response to success in an earlier performed device authentication among the authentications, another device authentication among the authentications is performed, and performing control such that in response to failure in the earlier performed device authentication, said another device authentication is not performed.

2. The power receiving apparatus according to claim 1, wherein the control unit determines a power value for which a request is made to the power transmitting apparatus on the basis of a result of a performed device authentication.

3. The power receiving apparatus according to claim 2, wherein in a case where the earlier performed device authentication is not successful, the control unit sends to the power transmitting apparatus a request for a smaller power value than that when both the earlier performed device authentication and said another device authentication are successful.

4. The power receiving apparatus according to claim 1, wherein the control unit requests the power transmitting apparatus to stop power transmission in response to failure in the earlier performed device authentication.

5. The power receiving apparatus according to claim 1, wherein the failure in the device authentication includes failure to receive a predetermined signal within a predetermined time.

6. The power receiving apparatus according to claim 1, wherein the authentication unit performs exclusively a first device authentication which is one of the device authentications and a second device authentication which is another of the device authentications.

7. The power receiving apparatus according to claim 6, wherein the authentication unit suspends or ignores a request for the second device authentication over a period during which the authentication unit performs the first device authentication.

8. A power transmitting apparatus comprising:
a power transmitting unit configured to wirelessly transmit power to a power receiving apparatus;
an authentication unit configured to mutually perform device authentications with the power receiving apparatus; and
a control unit configured to determine content related to power transmission on the basis of a result of a performed device authentication, wherein
the control unit is capable of performing control such that in response to success in an earlier performed device authentication among the device authentications, another device authentication among the device authentications is performed, and performing control such that in response to failure in the earlier performed device authentication, said another device authentication is not performed.

9. The power transmitting apparatus according to claim 8, wherein the control unit determines a power value allowable at the time of power transmission to the power receiving apparatus on the basis of a result of a performed device authentication.

10. The power transmitting apparatus according to claim 9, wherein in a case where the earlier performed device authentication is not successful, the control unit determines, as the allowable power value, a smaller power value than that when both the earlier performed device authentication and said another device authentication are successful.

11. The power transmitting apparatus according to claim 8, wherein the control unit stops power transmission to the power receiving apparatus in response to failure in the earlier performed device authentication.

12. The power transmitting apparatus according to claim 8, wherein the failure in the device authentication includes failure to receive a predetermined signal within a predetermined time.

13. The power transmitting apparatus according to claim 8, wherein the authentication unit performs exclusively a first device authentication which is one of the device authentications and a second device authentication which is another of the device authentications.

14. The power transmitting apparatus according to claim 13, wherein the authentication unit suspends or ignores a request for the first device authentication over a period during which the authentication unit performs the second device authentication.

15. The power transmitting apparatus according to claim 8, wherein the power transmitting apparatus transmits power to the power receiving apparatus by using power supplied from a power supply apparatus, and
the authentication unit performs an authentication with the power supply apparatus.

16. A control method performed by a power receiving apparatus that wirelessly receives power from a power transmitting apparatus, the control method comprising:
performing control such that in response to success in an earlier performed device authentication among device authentications to be mutually performed with the power transmitting apparatus, another device authentication among the device authentications is performed, and performing control such that in response to failure in the earlier performed device authentication, said another device authentication is not performed;
determining content related to power reception on the basis of a result of a performed device authentication; and
receiving power from the power transmitting apparatus wirelessly based on the determined content.

17. A control method performed by a power transmitting apparatus that wirelessly transmits power to a power receiving apparatus, the control method comprising:
performing control such that in response to success in an earlier performed device authentication among device authentications to be mutually performed with the power receiving apparatus, another device authentication among the authentications is performed, and performing control such that in response to failure in the earlier performed device authentication, said another device authentication is not performed;
determining content related to power transmission on the basis of a result of a performed device authentication; and
transmitting power to the power receiving apparatus wirelessly based on the determined content.

18. A non-transitory computer-readable storage medium storing a computer program for causing a control method performed by a power receiving apparatus that wirelessly receives power from a power transmitting apparatus, the control method comprising:
performing control such that in response to success in an earlier performed device authentication among device authentications to be mutually performed with the power transmitting apparatus, another device authentication among the device authentications is performed, and performing control such that in response to failure in the earlier performed device authentication, said another device authentication is not performed;
determining content related to power reception on the basis of a result of a performed device authentication; and
receiving power from the power transmitting apparatus wirelessly based on the determined content.

19. A non-transitory computer-readable storage medium storing a computer program for causing a control method performed by a power transmitting apparatus that wirelessly transmits power to a power receiving apparatus, the control method comprising:
performing control such that in response to success in an earlier performed device authentication among device authentications to be mutually performed with the power receiving apparatus, another device authentication among the authentications is performed, and performing control such that in response to failure in the earlier performed device authentication, said another device authentication is not performed;
determining content related to power transmission on the basis of a result of a performed device authentication; and
transmitting power to the power receiving apparatus wirelessly based on the determined content.

* * * * *